(12) United States Patent
Crucs

(10) Patent No.: US 8,584,149 B2
(45) Date of Patent: *Nov. 12, 2013

(54) METHODS OF POPULATING A THIRD-PARTY DOCUMENT WITH DIGITAL INFORMATION CONTENT

(75) Inventor: Kevin M. Crucs, Copley, OH (US)

(73) Assignee: Apteryx, Inc., Akron, OH (US)

( * ) Notice: Subject to any disclaimer, the term of this patent is extended or adjusted under 35 U.S.C. 154(b) by 899 days.

This patent is subject to a terminal disclaimer.

(21) Appl. No.: 12/540,618

(22) Filed: Aug. 13, 2009

(65) Prior Publication Data

US 2009/0320052 A1 Dec. 24, 2009

Related U.S. Application Data

(63) Continuation-in-part of application No. 11/778,116, filed on Jul. 16, 2007, now Pat. No. 8,108,883.

(51) Int. Cl.
G06F 9/44 (2006.01)

(52) U.S. Cl.
USPC .............................................. 719/329; 704/2

(58) Field of Classification Search
USPC .......................................................... 719/329
See application file for complete search history.

(56) References Cited

U.S. PATENT DOCUMENTS

| 6,100,888 | A | * | 8/2000 | Gourdol et al. ............... 715/837 |
| 7,970,796 | B1 | * | 6/2011 | Narayanan ..................... 707/802 |
| 2002/0111962 | A1 | | 8/2002 | Crucs |
| 2003/0055624 | A1 | * | 3/2003 | Fletcher et al. .................. 704/2 |
| 2006/0206457 | A1 | | 9/2006 | Crucs |
| 2007/0055696 | A1 | * | 3/2007 | Currie et al. ............... 707/104.1 |

* cited by examiner

Primary Examiner — Andy Ho
Assistant Examiner — Abdou Seye
(74) Attorney, Agent, or Firm — Hahn Loeser & Parks LLP

(57) ABSTRACT

Systems and methods of transferring information from at least one source context to at least one target context, and associated physical computer-readable medium. A service software application is used on a processor-based platform to transfer digital data content from at least one data source to at least one data target in at least a semi-automatic manner. The data source is associated with a source software application and the data target is associated with a target software application. The digital data content includes, for example, text data, image data, graphics data, or a clipboard object.

18 Claims, 20 Drawing Sheets

METHODS OF POPULATING A THIRD-PARTY DOCUMENT WITH DIGITAL INFORMATION CONTENT

This U.S. Patent Application is a continuation-in-part (CIP) of U.S. patent application Ser. No. 11/778,116 filed on Jul. 16, 2007, now U.S. Pat. No. 8,108,883.

TECHNICAL FIELD

Certain embodiments of the present invention relate to the generation of documentation. More particularly, certain embodiments of the present invention relate to methods of transferring information (e.g., images, text, graphics) from a data source to at least one data target.

BACKGROUND

It is often desirable to import digital data content, such as text or images, into a third-party document or target application from some other application. For example, a physician or dentist may desire to create a third-party document using medical images that are accessible from a patient management software application. The third-party document may be a medical report created by the physician, for example.

Today, digital image content may be automatically imported into a word processing document using a somewhat complex configuration of macros and document templates. For example, an image management software application can copy a document template to a target directory and save image files and patient information files to that target directory. The document template includes a set of macros. A user can then invoke a word processing application (a third-party application), and use the word processing application to open the document template and run the macros in the document template, within the target directory, to populate various areas in a document of the word processing application with the image and patient content from the image files and patient information files. Such an implementation is cumbersome and unique to working with a particular word processing application.

It is desirable to have a more flexible and less complex way to populate any type of third-party document or data target with many different types of digital data content.

Further limitations and disadvantages of conventional, traditional, and proposed approaches will become apparent to one of skill in the art, through comparison of such systems and methods with the subject matter of the present application as set forth in the remainder of the present application with reference to the drawings.

SUMMARY

An embodiment of the present invention comprises a method of transferring information from at least one data source to at least one data target. The method includes launching a service software application on a processor-based platform. The method further includes the service software application enabling the grabbing of digital data content from at least one data source and populating the digital data content into at least one data target according to a pre-defined mapping in at least a semi-automatic manner. The method may further include the service software application enabling the modifying of the digital data content, in at least a semi-automatic manner, before the digital data content is populated into at least one data target.

Another embodiment of the present invention comprises a system for transferring information from at least one data source to at least one data target. The system includes means for enabling the grabbing of digital data content from at least one data source and populating the digital data content into at least one data target according to a pre-defined mapping in at least a semi-automatic manner. The system may further include means for enabling the modifying of the digital data content, in at least a semi-automatic manner, before the digital data content is populated into at least one data target.

A further embodiment of the present invention comprises a physical computer-readable medium encoded with computer-executable instructions constituting a service software application for transferring information from at least one data source to at least one data target. The computer-executable instructions include program code for enabling the grabbing of digital data content from at least one data source and the populating of the digital data content into at least one data target according to a pre-defined mapping in at least a semi-automatic manner. The computer-executable instructions may further include program code for enabling the modifying of the digital data content, in at least a semi-automatic manner, before the digital data content is populated into at least one data target.

Another embodiment of the present invention comprises a method of transferring information from a data source to at least one data target. The method includes launching a source software application on a processor-based platform and displaying data content of a data source on a display of the processor-based platform using the source software application. The method further includes launching a service software application on the processor-based platform and displaying a service window, having at least one transfer data field, on the display of the processor-based platform in response to launching the service software application. The method also includes performing a copy/paste operation to copy first digital data content from the data source to at least one transfer data field of the service window. The method further includes the service software application automatically populating at least one data target provided by at least one target software application with the first digital data content. The first digital data content may include at least one of text data, image data, graphics data, and a clipboard object. In accordance with an embodiment of the present invention, the step of launching the service software application occurs automatically in response to the step of launching the source software application. The step of the service software application automatically populating occurs in response to the step of performing the copy/paste operation. The method may further include positioning the service window over at least one data target before the step of the service software application automatically populating, wherein the positioning determines which data target to populate. In accordance with another embodiment of the present invention, the step of the service software application automatically populating includes the service software application automatically launching at least one target software application. Alternatively, launching of at least one target software application may occur before performing the step of the service software application automatically populating. In accordance with an embodiment of the present invention, at least one transfer data field is pre-linked to at least one data target by the service software application. The step of performing the copy/paste operation is automatically performed by a pre-defined macro called by the service software application, in accordance with an embodiment of the present invention. Alternatively, the copy/paste operation may be performed manually by a user using, for example, a computer mouse.

A further embodiment of the present invention comprises a system for transferring information from a data source to at least one data target. The system includes means for displaying a service window, having at least one transfer data field, and a data source provided by a source software application. The system further includes means for performing a copy/paste operation to copy a first digital data content from the data source to at least one transfer data field. The system also includes means for automatically populating at least one data target provided by at least one target software application with the first digital data content.

Another embodiment of the present invention comprises a physical computer-readable medium encoded with computer-executable instructions constituting a service software application for transferring information from a data source to at least one data target. The computer-executable instructions include program code for displaying a service window, having at least one transfer data field, on a display of a computer-based platform. The computer-executable instructions further include program code for performing a copy/paste operation to copy first digital data content from a data source provided by a source software application to at least one transfer data field of the service window. The computer-executable instructions also include program code for automatically populating at least one data target provided by at least one target software application with the first digital data content.

A further embodiment of the present invention comprises a method of transferring information from a data source to at least one data target. The method includes launching a source software application on a processor-based platform and launching a service software application on the processor-based platform. The method further includes displaying a service application icon on a display of the processor-based platform in response to launching of the service software application. The method also includes displaying at least one data source having data content on the display of the processor-based platform using the source software application. The method further includes positioning the service application icon over a first displayed data source of the at least one data source having first digital data content. The method also includes the service software application automatically pulling the first digital data content from the first data source in response to the positioning. The method further includes the service software application automatically populating at least one data target provided by at least one target software application with the first digital data content in response to the pulling. The first digital data content may include at least one of text data, image data, graphics data, and a clipboard object. In accordance with an embodiment of the present invention, the step of launching the service software application occurs automatically in response to the step of launching the source software application. The step of the service software application automatically populating includes the service software application automatically launching the at least one target software application. Alternatively, the at least one target software application may be launched before performing the step of positioning the service application icon. In accordance with an embodiment of the present invention, the service software application is pre-linked to at least one data target provided by the target software application.

Another embodiment of the present invention comprises a system for transferring information from a data source to at least one data target. The system includes means for displaying a service application icon and at least one data source provided by a source software application. The system further includes means for positioning the displayed service application icon on the means for displaying. The system also includes means for automatically pulling a first digital data content from a first data source of at least one data source in response to positioning a displayed service application icon over the first data source. The system further includes means for automatically populating at least one data target provided by at least one target software application with a first digital data content in response to automatically pulling a first digital data content from a first data source.

A further embodiment of the present invention comprises a physical computer-readable medium encoded with computer-executable instructions constituting a service software application for transferring information from a data source to at least one data target. The computer-executable instructions include program code for displaying a service application icon on a display of a computer-based platform in response to launching a service software application on the computer-based platform. The computer-executable instructions further include program code for automatically pulling a first digital data content from a first data source provided by a source software application in response to positioning the service application icon over the first data source. The computer-executable instructions also include program code for automatically populating at least one data target provided by at least one target software application with the first digital data content in response to the pulling.

Another embodiment of the present invention comprises a method of transferring information from at least one data source to at least one data target. The method includes launching a service software application on a processor-based platform. The method further includes the service software application automatically launching at least one source software application providing at least one data source on the processor-based platform. The method also includes the service software application automatically launching at least one target software application providing at least one data target on the processor-based platform. The method further includes the service software application automatically pulling at least a first digital data content from the at least one data source and automatically populating the at least one data target with the at least first digital data content. The first digital data content may include at least one of text data, image data, graphics data, and a clipboard object. In accordance with an embodiment of the present invention, the at least one data source is pre-linked to the at least one data target by the service software application.

A further embodiment of the present invention comprises a system for transferring information from a data source to at least one data target. The system includes means for automatically launching at least one source software application providing at least one data source. The system further includes means for automatically launching at least one target software application providing at least one data target. The system also includes means for automatically pulling at least a first digital data content from at least one data source. The system further includes means for automatically populating at least one data target with at least a first digital data content.

Another embodiment of the present invention comprises a physical computer-readable medium encoded with computer-executable instructions constituting a service software application for transferring information from a data source to at least one data target. The computer-executable instructions include program code for automatically launching at least one source software application providing at least one data source. The computer-executable instructions further include program code for automatically launching at least one target software application providing at least one data target. The computer-executable instructions also include program code for automatically pulling at least a first digital data content from the at least one data source and automatically populating the at least one data target with the at least first digital data content.

A further embodiment of the present invention comprises a method of transferring information from a data source to at least one data target. The method includes launching a source software application on a processor-based platform and launching a service software application on the processor-based platform. The method further includes displaying a service application icon on a display of the processor-based platform in response to launching the service software application. The method also includes displaying a plurality of data sources populated with digital data content, provided by the source software application, on the display of the processor-based platform. The method further includes positioning the service application icon near the plurality of data sources on the display. The method also includes the service software application automatically extracting the digital data content from at least a portion of the plurality of data sources, according to a pre-defined data extraction format, in response to the positioning. The method further includes the service software application automatically populating a plurality of data targets provided by at least one target software application with the extracted digital data content, according to at least one pre-defined data populating format, in response to the extracting. The digital data content includes at least one of text data, image data, graphics data, and a clipboard object. In accordance with an embodiment of the present invention, the step of launching the service software application occurs automatically in response to the step of launching the source software application. The step of the service software application automatically populating includes the service software application automatically launching the at least one target software application, in accordance with an embodiment of the present invention. Alternatively, launching the at least one target software application may occur before performing the step of positioning the service application icon. In accordance with an embodiment of the present invention, the service software application is pre-linked to the at least one target software application.

Another embodiment of the present invention comprises a system for transferring information from a data source to at least one data target. The system includes means for displaying a service application icon and a plurality of data sources provided by a source software application. The system further includes means for positioning a displayed service application icon on the means for displaying. The system also includes means for automatically extracting digital data content from a plurality of data sources, according to a pre-defined data extraction format, in response to positioning a displayed service application icon near a plurality of data sources on the means for displaying. The system further includes means for automatically populating a plurality of data targets provided by at least one target software application with extracted digital data content, according to at least one pre-defined data populating format, in response to automatically extracting digital data content from a plurality of data sources.

A further embodiment of the present invention comprises a physical computer-readable medium encoded with computer-executable instructions constituting a service software application for transferring information from a data source to at least one data target. The computer-executable instructions include program code for displaying a service application icon on a display of a computer-based platform in response to launching the service software application on the computer-based platform. The computer-executable instructions further include program code for automatically extracting digital data content from a plurality of data sources provided by a source software application, according to a pre-defined data extraction format, in response to positioning the service application icon near the plurality of data sources on the display of the computer-based platform. The computer-executable instructions also include program code for automatically populating a plurality of data targets provided by at least one target software application with the extracted digital data content from the plurality of data sources, according to at least one pre-defined data populating format, in response to automatically extracting the digital data content from the plurality of data sources.

These and other advantages and novel features of the present invention, as well as details of an illustrated embodiment thereof, will be more fully understood from the following description and drawings.

DETAILED DESCRIPTION

Figure 1:
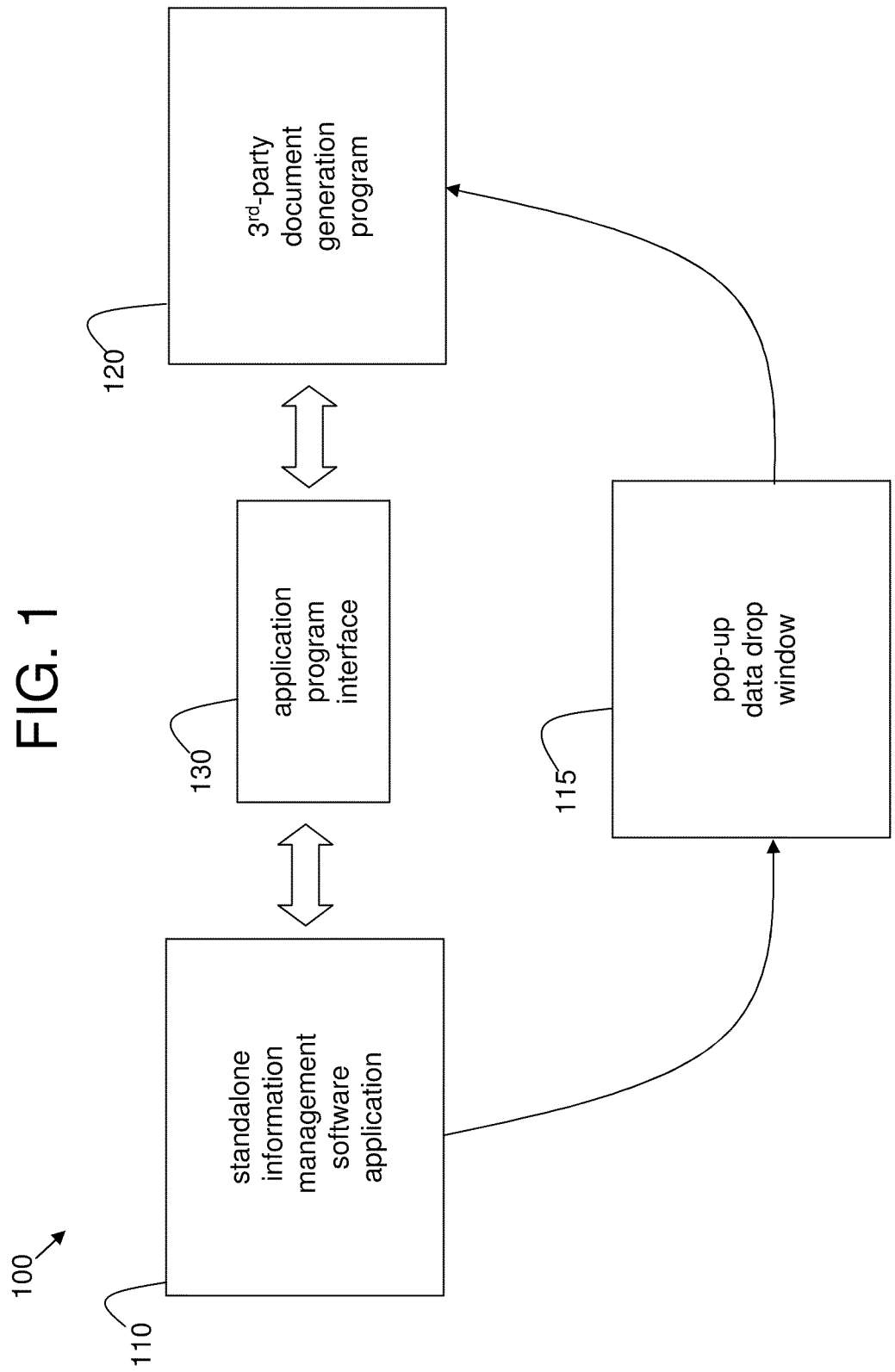
FIG. 1 is a representative illustration of the relationships between software components used on a computer-based platform to populate a third-party document with digital information content, in accordance with an embodiment of the present invention.

FIG. 1 is a representative illustration 100 of the relationships between software components used on a computer-based platform to populate a third-party document with digital information content, in accordance with an embodiment of the present invention. The various software components include a standalone information management software application 110, a third-party document generation program 120, and at least one application program interface (API) 130 providing communication between the standalone information management software application 110 and the third-party document generation program 120. A pop-up data drop window 115 may be opened within the information management software application 110 to facilitate the population of a third-party document, as is described herein.

The information management software application 110 may be any type of software application that is capable of manipulating and managing information in some way. For example, in accordance with an embodiment of the present invention, the information management software application 110 comprises a patient management software application that is used in a medical office (e.g., a doctor's office or a dentist's office) or a hospital, for example, to manage patient records, medical images, medical insurance information, etc. In accordance with another embodiment of the present invention, the information management software application 110 comprises an insurance management software application that is used in an insurance office, for example, to manage the policies and claims of insured automobile drivers. Other information management software application embodiments for other applications are possible as well, in accordance with other embodiments of the present invention.

The third-party document generation application 120 may be any type of software application that is capable of creating a digital document and manipulating digital information within that document. For example, in accordance with an embodiment of the present invention, the third-party document generation application 120 comprises a word processing software application. In accordance with another embodiment of the present invention, the third-party document generation application 120 comprises a slide presentation software application. Other third-party document generation application embodiments for other applications are possible as well, in accordance with other embodiments of the present invention.

In accordance with various embodiments of the present invention, both the third-party document generation application 120 and the information management software application 110 are capable of running on a computer-based platform such as, for example, a personal computer (PC) or a work station.

Figure 2:
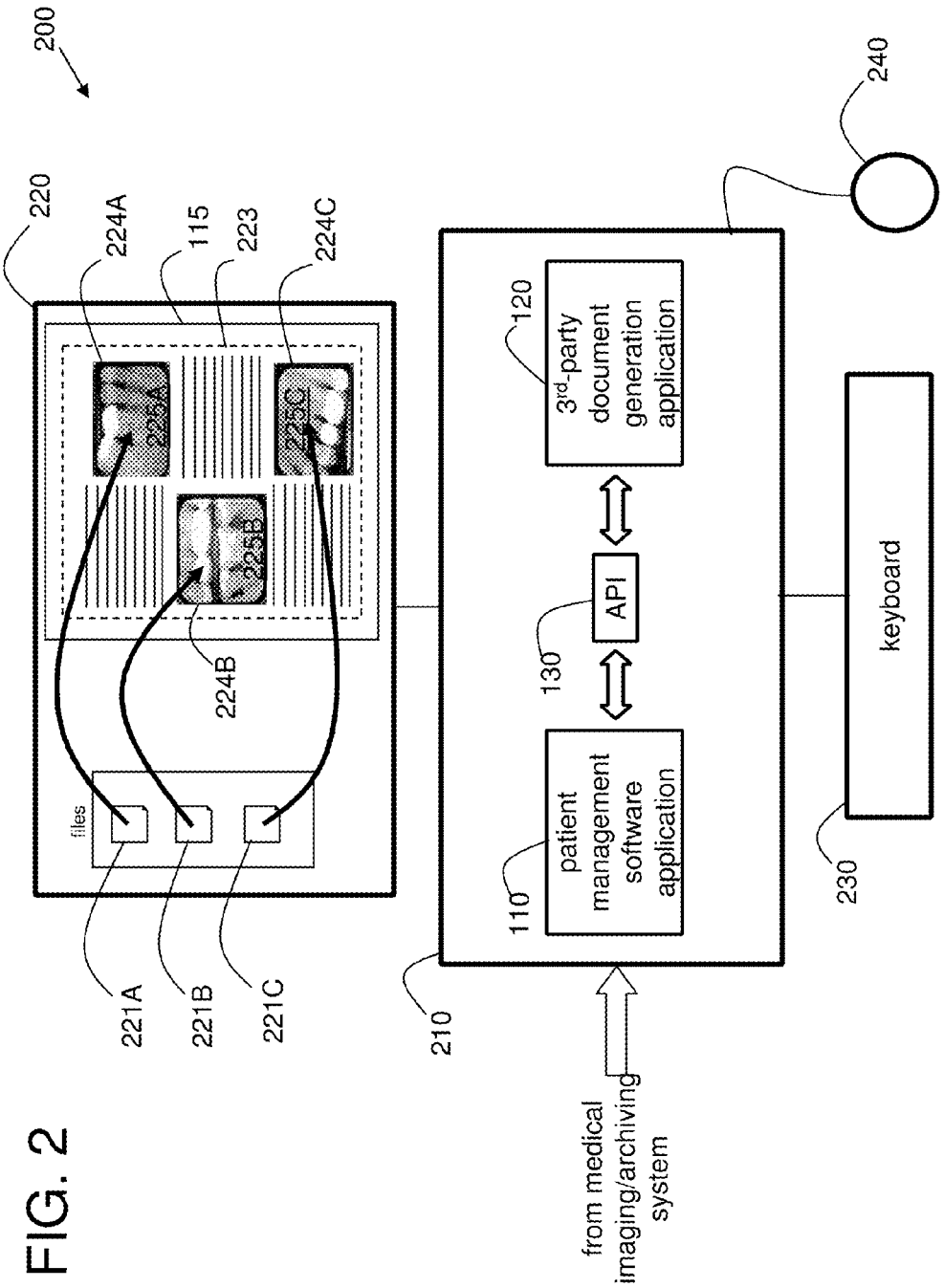
FIG. 2 is a schematic illustration of an exemplary embodiment of a computer-based platform used to populate a third-party document with digital information content using the software component relationships of FIG. 1, in accordance with various aspects of the present invention.

FIG. 2 is a schematic illustration of an exemplary embodiment of a computer-based platform 200 used to populate a third-party document with digital information content using the software component relationships 100 of FIG. 1, in accordance with various aspects of the present invention. In accordance with an embodiment of the present invention, the computer-based platform 200 includes a processor-based component 210 including processing-capability and memory for running the software applications. The computer-based platform 200 also includes a display 220, a keyboard 230 and a mouse 240, all operationally connected to the processor-based component 210. The computer-based platform 200 may be any standard, custom, and/or commercially available platform capable of running the patient management software application 110, the third-party document generation application 120, and at least one API 130.

In accordance with an embodiment of the present invention, the computer-based platform 200 is capable of interfacing with a medical imaging/archiving system (not shown) via a network (not shown) using the patient management software application 110. In such an embodiment, the patient management software application 110 is capable of downloading medical images, patient records, and other information from the medical imaging/archiving system.

Figure 3:
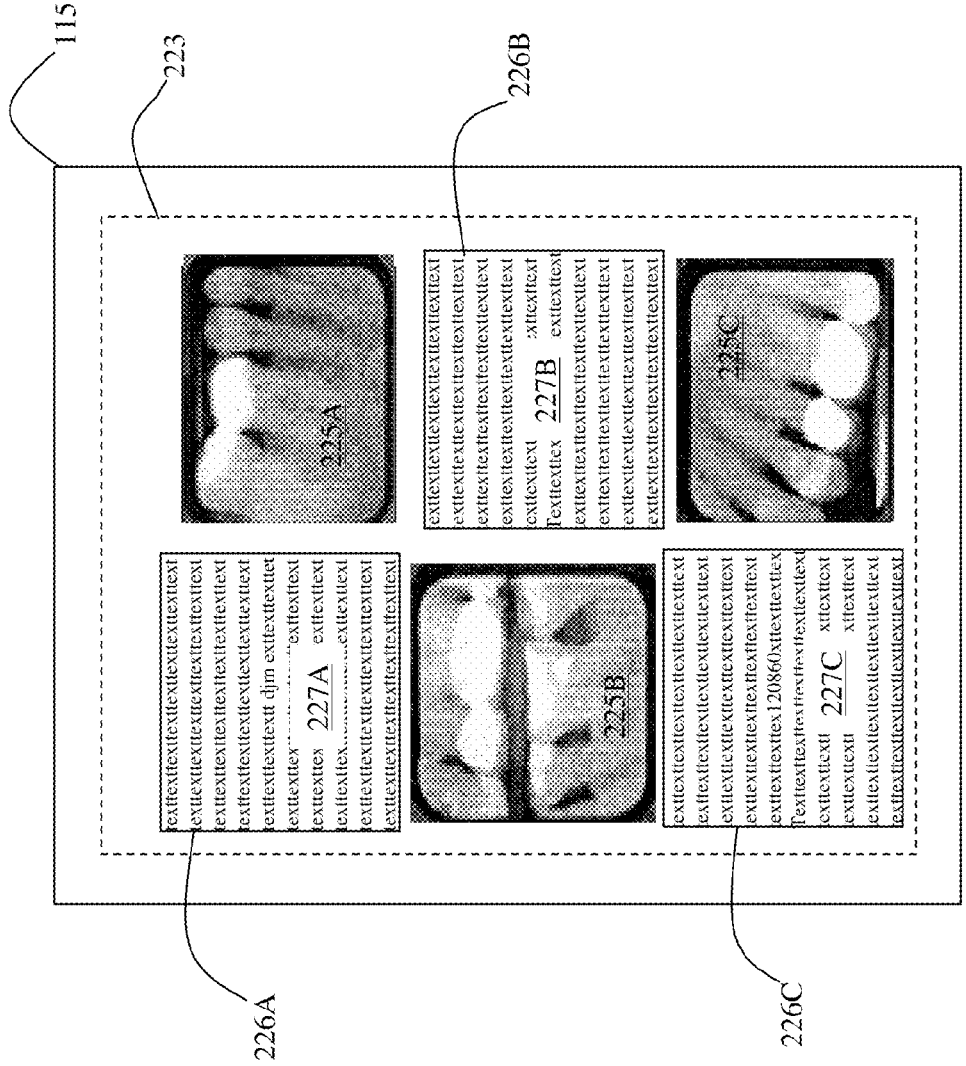
FIG. 3 is an illustration of a first exemplary embodiment of a data drop window displaying a representation of a document layout that is populated with image and text digital data content, in accordance with various embodiments of the present invention.
Figure 4:
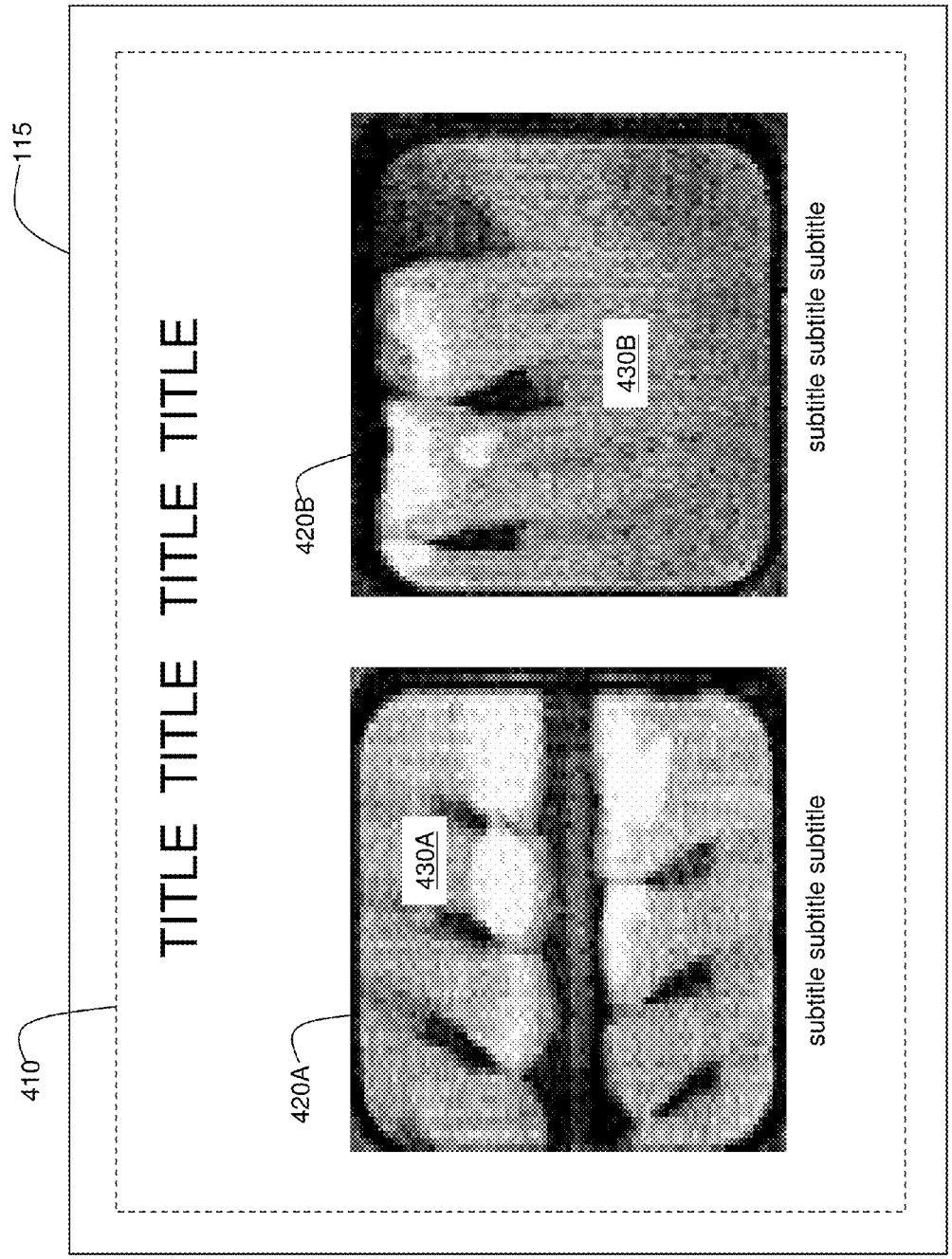
FIG. 4 is an illustration of a second exemplary embodiment of a data drop window displaying a representation of a document layout that is populated with image digital data content, in accordance with various embodiments of the present invention.

As shown on the display 220 of the computer-based platform 200, digital files 221A-221C may be dragged and dropped into a data drop window 115 in order to populate a representation 223 of a document layout displayed in the data drop window 115, as is described herein in more detail below. The digital files 221A-221C are represented by graphical icons on the display 220. FIG. 3 is an illustration of a first exemplary embodiment of the data drop window 115 displaying a document layout representation 223 of a word processing document layout that is populated with image and text digital data content, in accordance with various embodiments of the present invention. FIG. 4 is an illustration of a second exemplary embodiment of a data drop window 115 displaying a representation 410 of a slide presentation document layout that is populated with image digital data content, in accordance with various embodiments of the present invention.

The representations 223 and 410 include data holder locations into which the digital files may be dragged and dropped into, and within which the corresponding digital data content may be displayed. For example, referring again to FIG. 2, the digital file 221A may be selected (e.g., using the mouse 240)

and dragged and dropped into a first data holder location 224A, using the patient management software application 110 on the computer-based platform 200. When the digital file 221A is dragged and dropped into the data holder location 224A, the corresponding digital data content (an image) 225A of the digital file 221A is displayed within the data holder location 224A. Similarly, the digital files 221B and 221C may be selected and dragged and dropped into the respective data holder locations 224B and 224C, wherein the corresponding digital data content (images) 225B and 225C are displayed. The data holder locations 224A-224C do not have to be tied in any way to the digital files 221A-221C before dragging and dropping. For example, the digital file 221A could be dropped into the data holder location 224B or 224C. As long as there is a defined data holder location within the document representation 223, a digital file may be dropped into that data holder location, as long as the data holder location is not already populated with digital data content.

Referring again to FIG. 3, text data content may also be populated into the document layout representation 223 in the data drop window 115 in a similar manner to image data content. That is, a digital file in the information management software application 110 may be selected and dragged and dropped into a data holder location such that the text data content is displayed in the data drop holder location. For example, the data holder location 226A may be populated with the text data content 227A. Similarly, the data holder locations 226B and 226C may be respectively populated with the text data content 227B and 227C. Referring again to FIG. 4, image data content 430A and 430B have been populated into data holder locations 420A and 420B, respectively, within the document representation 410 of the data drop window 115. In accordance with an embodiment of the present invention, the digital data content (e.g., text, images) are automatically sized to fit the corresponding data holder locations.

Figure 5:
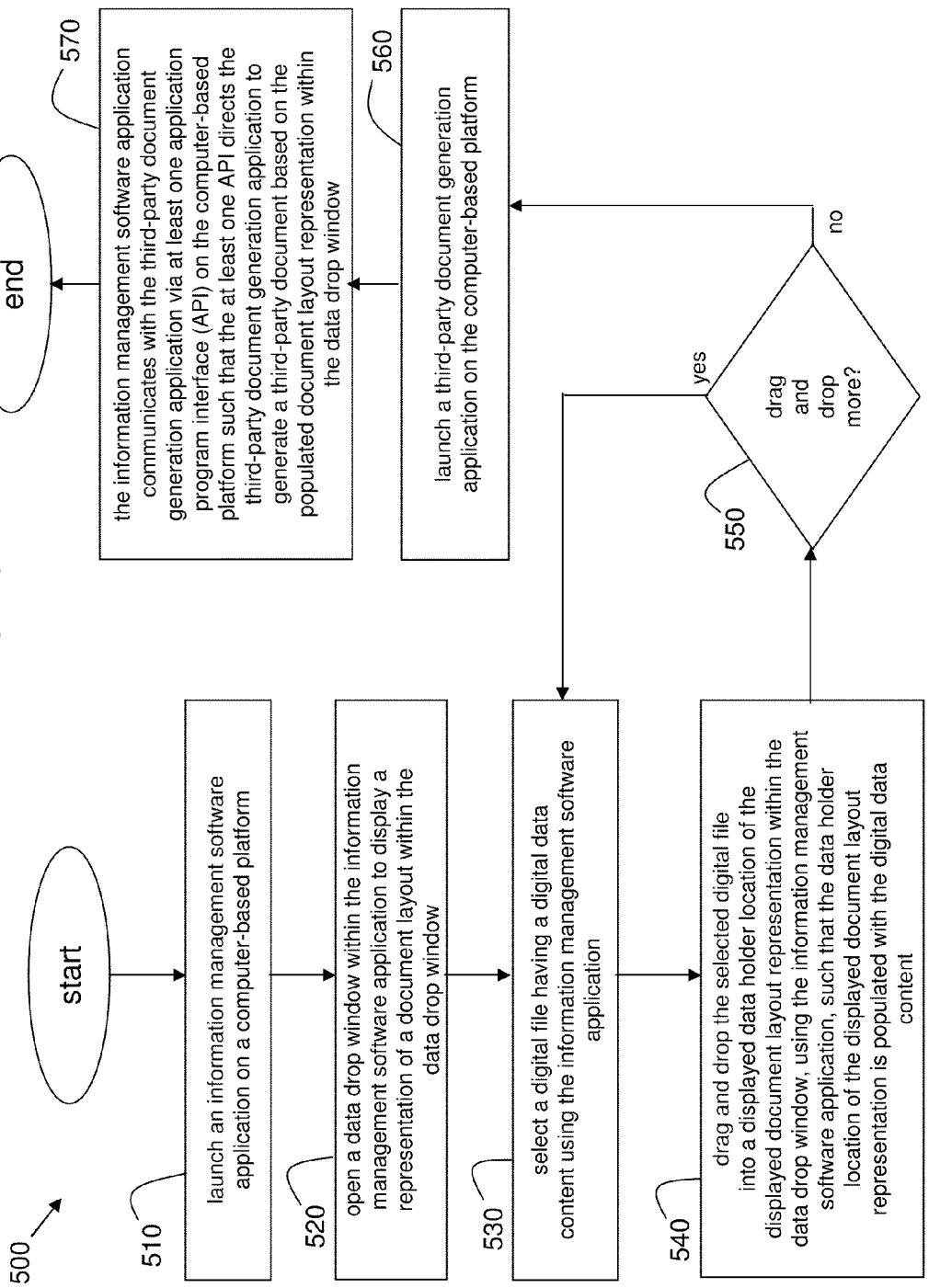
FIG. 5 is a flowchart of a first exemplary embodiment of a method of populating a document with digital information content, in accordance with various aspects of the present invention.

FIG. 5 is a flowchart of a first exemplary embodiment of a method 500 of populating a document with digital information content, in accordance with various aspects of the present invention. In step 510, an information management software application is launched on a computer-based platform. In step 520, a data drop window is opened within the information management software application to display a representation of a document layout within the data drop window. In step 530, a digital file having a digital data content is selected using the information management software application. In step 540, the selected digital file is dragged and dropped into a displayed data holder location of the displayed document layout representation within the data drop window, using the information management software application, such that the data holder location of the displayed document layout representation is populated with the digital data content.

In step 550, a decision is made as to whether or not to select and drag and drop any further digital files into other data holder locations of the document layout representation (e.g., second and third digital files containing second and third digital data content to be dropped into second and third data holder locations). If so, then the additional digital files are dragged and dropped. If not, then in step 560, a third-party document generation application is launched on the computer-based platform. In step 570, the information management software application communicates with the third-party document generation application via at least one application program interface (API) on the computer-based platform such that the at least one API directs the third-party document generation application to generate a third-party document based on the populated document layout representation within the data drop window. The third-party document generation application does not have to be launched exactly after step 560. However, the third-party document generation application is launched sometime before step 570 is executed. That is, the third-party document generation application has to be launched before the API can communicate between the two applications.

Therefore, the method 500 of FIG. 5 clearly shows that the populated document layout representation (e.g., the populated document layout representation 223 in FIG. 2 and FIG. 3) is used to generate and populate a third-party document. The third-party document may be a word processing document, a slide presentation document, or some other type of document that may be generated by the corresponding third-party document generation application 120, in accordance with various embodiments of the present invention. The digital data content may comprise text, images, graphics, and/or clipboard objects, in accordance with an embodiment of the present invention. Also, the information management software application may be, for example, a patient management software application.

Figure 6:
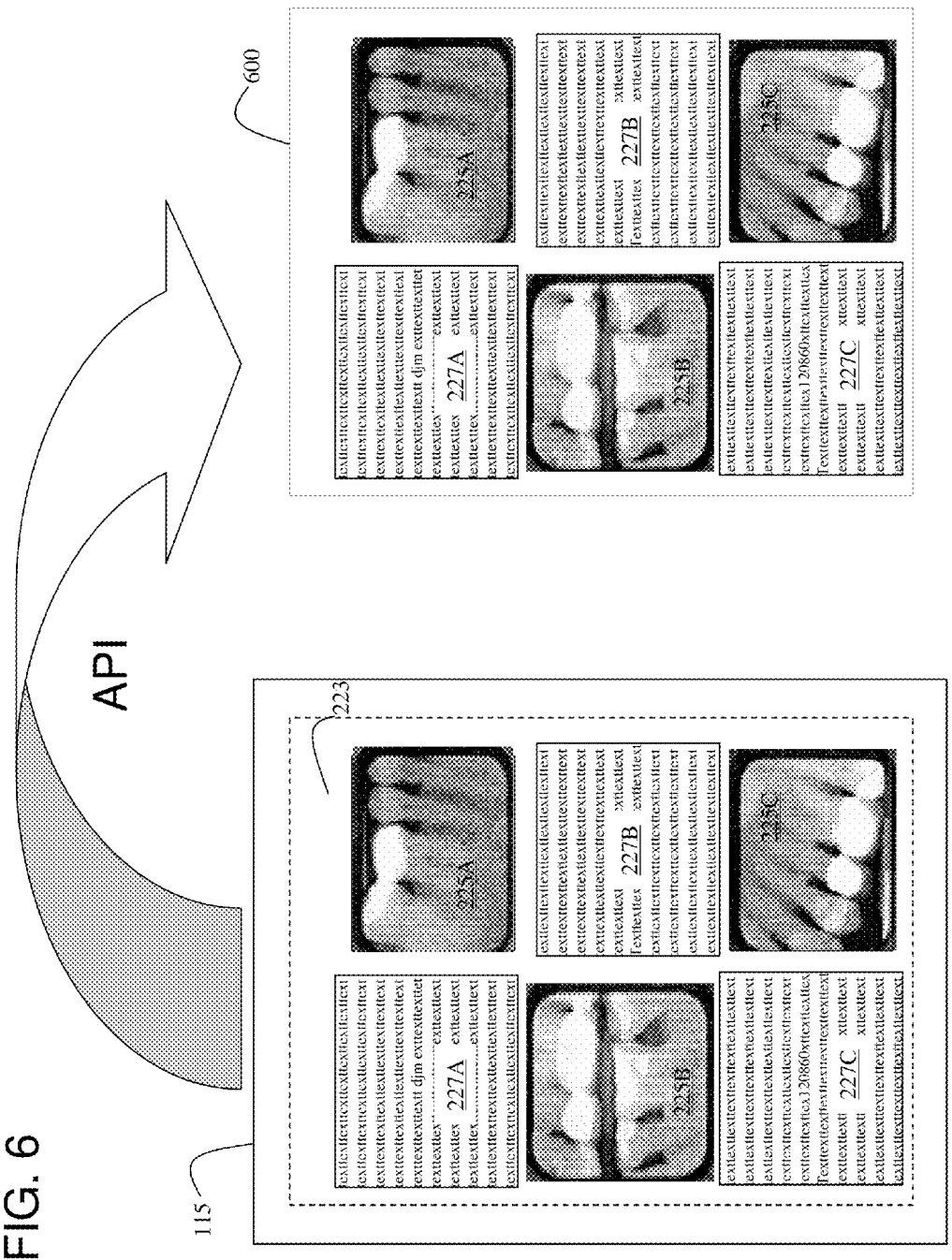
FIG. 6 graphically illustrates the concept of a populated document layout representation being used to generate a third-party document, in accordance with an embodiment of the present invention.

FIG. 6 graphically illustrates the concept of a populated document layout representation 223 being used to generate a third-party document 600, in accordance with an embodiment of the present invention. The third-party document 600 looks very similar to the populated document layout representation 223. However, the populated document layout representation 223 is simply a representation of a third-party document layout, whereas the third-party document 600 is an actual document that may be manipulated in accordance with all of the functionality provided by the third-party document generation application 120. For example, the third-party document may be edited, copied, and saved.

The illustrations and examples given so far herein are concerned with a single page of a document. For example, FIG. 6 illustrates a single page of a document layout representation being used to generate a corresponding single page of a third-party document. However, in accordance with an embodiment of the present invention, the document layout representation 223 and the third-party document 600 are not limited to a single page and may include a plurality of pages. The information management software application 110 provides the capability to jump forward or backward, as the case may be, to a page that is adjacent, in order, to the current page displayed. The document layout representation of the individual pages may be exactly the same, similar to, or very different from each other, in accordance with various embodiments of the present invention.

In accordance with an embodiment of the present invention, just as digital files may be dragged and dropped into data holder locations, a digital file that has been previously copied to a clipboard using the information management software application may also be pasted to a data holder location using the information management software application. In such a case, the digital file comprises a clipboard object file and the corresponding digital data content comprises a clipboard object. As used herein, a clipboard object file is any type of formatted software element (e.g., a text clip, an image file, a graphic file) that allows any type of digital data content (e.g., text, an image, a graphic) to be copied to and pasted from a clipboard.

An embodiment of the present invention provides a software interface 130 embodied on a computer-readable medium for execution on a computer-based platform. The software interface 130 is executed in conjunction with an information management software program 110 for populating a document layout representation with image, text, graphic, and/or clipboard information, and in conjunction with a third-party document generation program 120 for generating third-party documents. The software interface comprises at least one application program interface (API) that facilitates communication between the information management software program and the third-party document generation program. The API directs the third-party document generation program to generate a third-party document based on a populated document layout representation displayed within a window of the information management software program.

In accordance with various embodiments of the present invention, the computer-readable medium may comprise a hard disk, a floppy disk, a compact disk (CD), a memory stick, a digital video disk (DVD), or any other type of computer-readable medium capable of having the computer-executable instructions as described herein.

Figure 7:
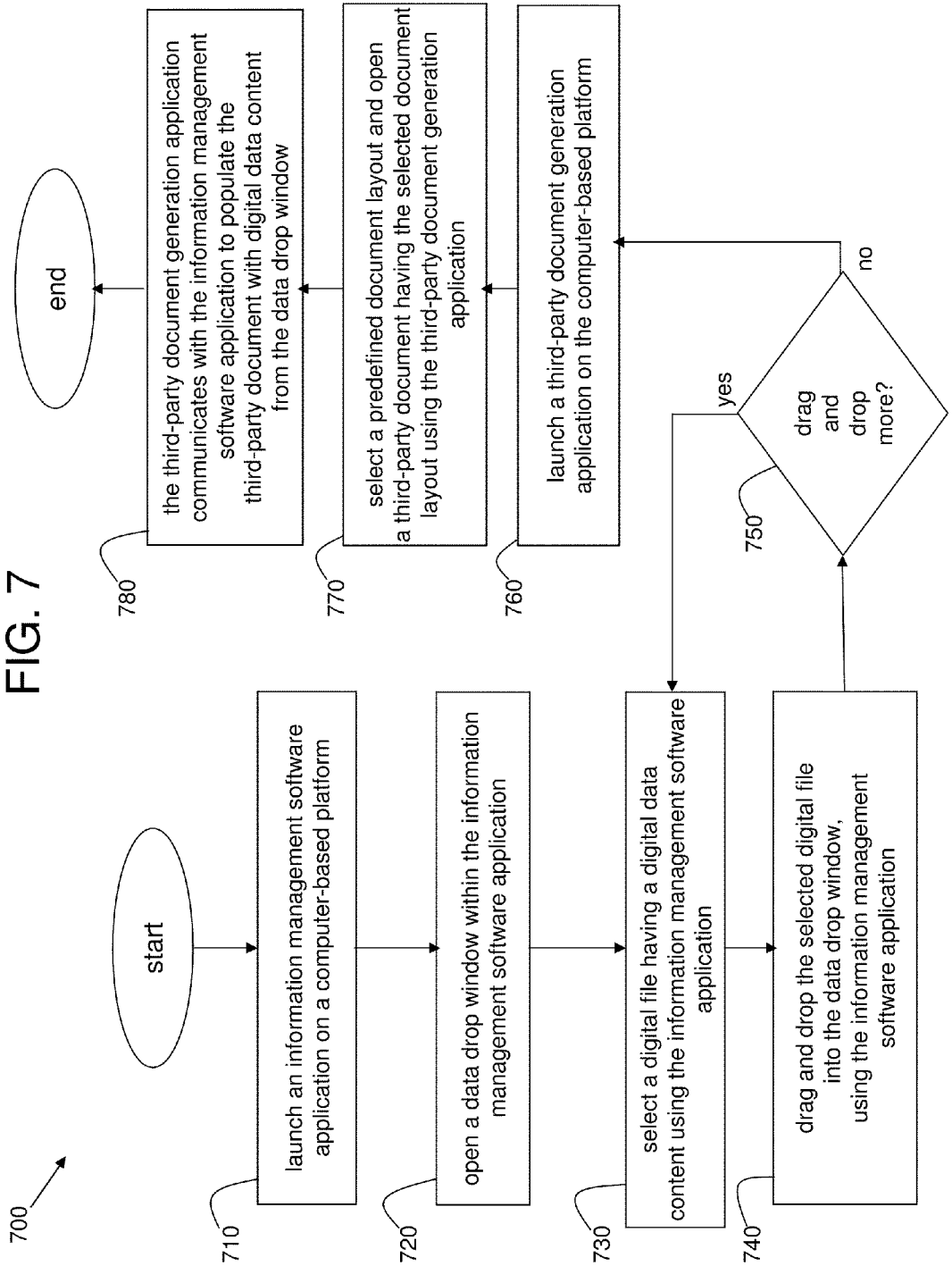
FIG. 7 is a flowchart of a second exemplary embodiment of a method of populating a document with digital information content, in accordance with various aspects of the present invention.

FIG. 7 is a flowchart of a second exemplary embodiment of a method 700 of populating a document with digital information content, in accordance with various aspects of the present invention. In step 710, an information management software application is launched on a computer-based platform. In step 720, a data drop window is opened within the information management software application. In step 730, a digital file having a digital data content is selected using the information management software application. In step 740, the selected digital file is dragged and dropped into the data drop window, using the information management software application. In step 750, a decision is made as to whether or not to select and drag and drop any further digital files into the data drop window. If so, then the additional digital files are dragged and dropped. If not, then in step 760, a third-party document generation application is launched on the computer-based platform. In step 770, a predefined document layout and a third-party document, having the selected document layout, are selected using the third-party document generation application. In step 780, the third-party document generation application communicates with the information management software application to populate the third-party document with digital data content from the data drop window. The third-party document generation application may communicate with the information management software application through at least one application program interface (API), in accordance with an embodiment of the present invention.

Notice that, in the method 700, the data drop window does not include a document layout representation. Instead, digital files are simply dropped into the data drop window. It is up to the third-party document generation application and/or an API to decide how to populate the data holder locations of the third-party document with the digital data content of the digital files in the data drop window based on a document layout selected using the third-party document generation application. For example, the data holder locations of the third-party document may be populated with digital data content based on the order in which the digital files were dropped into the data drop window. In other words, a first data holder location may be populated with the digital data content from a first digital file dropped into the data drop window and a second data holder location may be populated with the digital data content from a second digital file dropped into the data drop window, and so on. Again, the digital data content of the digital files may include text, image, graphic, and clipboard digital data content. As before, digital files copied to a clipboard may be pasted into the data drop window. Also, the information management software application may be, for example, a patient management software application. The third-party document generation application may be, for example, a word processing software application or a slide presentation software application.

Other populating schemes are possible as well. For example, the data holder locations of the third-party document may predefine the type of data holder location as a text, an image, or a graphic data holder location. Therefore, in accordance with an embodiment of the present invention, only digital data content that corresponds to a predefined data holder location type may be populated into that data holder location.

In accordance with an embodiment of the present invention, once the third-party document is populated with digital data content from the data drop window, a user may move the digital data content around to different data holder locations within the third-party document as part of the editing process of the third-party document generation application.

Figure 8:
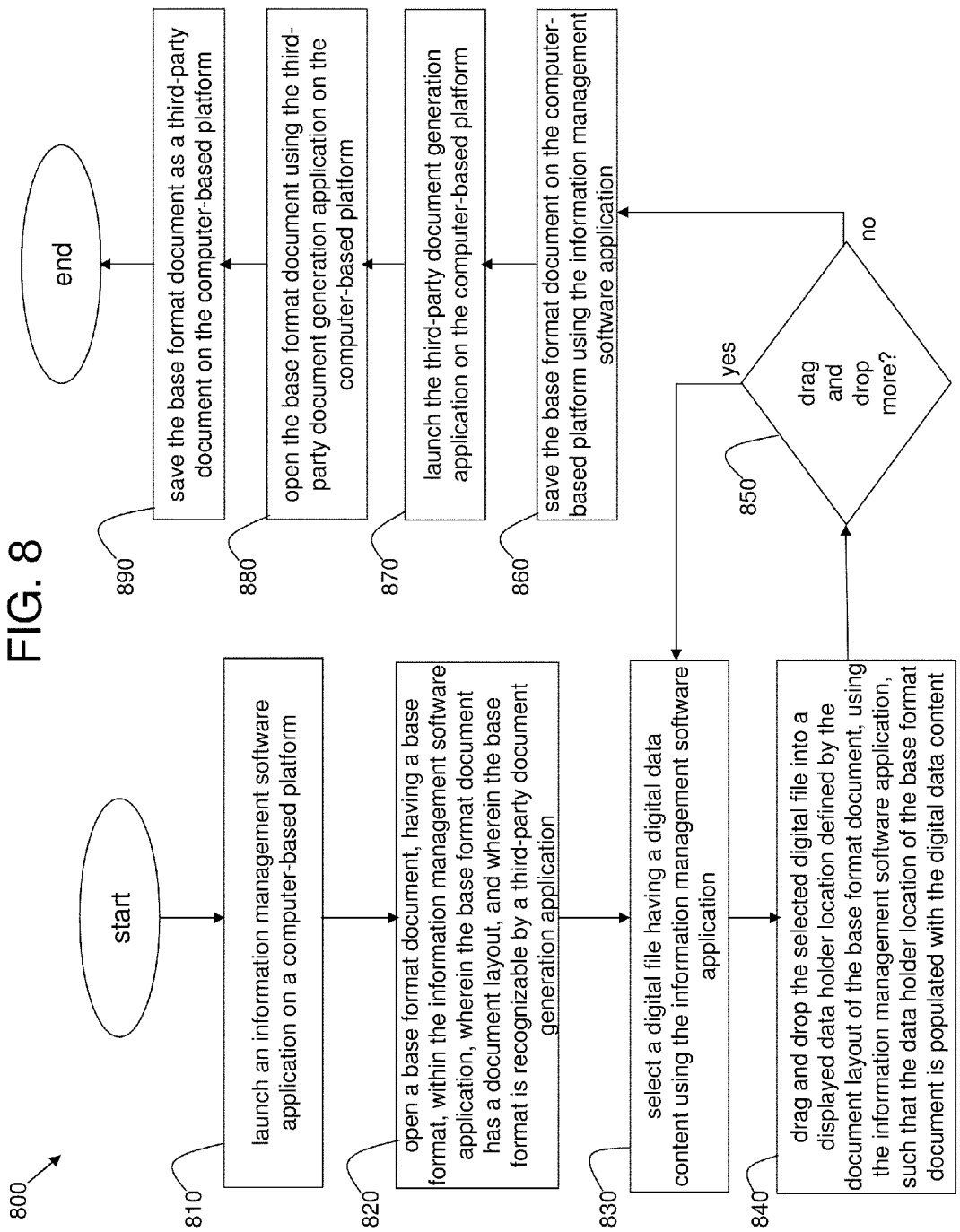
FIG. 8 is a flowchart of a third exemplary embodiment of a method of populating a document with digital information content, in accordance with various aspects of the present invention.

Other embodiments of the present invention do not use an application program interface (API) as does the method 500 of FIG. 5. For example, FIG. 8 is a flowchart of a third exemplary embodiment of a method 800 of populating a document with digital information content, in accordance with various aspects of the present invention. In step 810, an information management software application is launched on a computer-based platform. In step 820, a base format document, having a base format, is opened within the information management software application, wherein the base format document has a document layout, and wherein the base format is recognizable by a third-party document generation application. In step 830, a digital file having a digital data content is selected using the information management software application. In step 840, the selected digital file is dragged and dropped into a displayed data holder location defined by the document layout of the base format document using the information management software application, such that the data holder location of the base format document is populated with the digital data content. In step 850, a decision is made as to whether or not to select and drag and drop any further digital files into the base format document. If so, then the additional digital files are dragged and dropped. If not, then in step 860, the base format document is saved on the computer-based platform using the information management software application. In step 870, the third-party document generation application is launched on the computer-based platform. In step 880, the base format document is opened using the third-party document generation application on the computer-based platform. In step 890, the base format document is saved as a third-party document on the computer-based platform using the third-party document generation application. Again, digital files may be pasted into the base format document from the clipboard.

Notice that, in the method 800, instead of a data drop window, a base format document is provided, the base format of which is recognizable by the third-party document generation application. The base format document may have one or several pages, each page having one or more data holder locations. This means that the populated base format document, which is created in the information management software application, may be opened by the third-party document generation application and saved as (i.e., converted to) a regular third-party document (e.g., a word processing document if the third-party application is a word processing application, or a slide presentation document if the third-party application is a slide presentation application).

The base format document is not a full-up third party document but has enough of the basic characteristics of a third-party document such that the populated base format document can be turned into a full-up third-party document by opening the base format document using the third-party application, and by saving the base format document as a third-party document using the third-party application. By a full-up third-party document, as used herein, is meant a document that is capable of being fully manipulated (e.g., edited, copied, saved) according to the functionality of the third-party application. In the method 800, there is no communication between the information management software application and the third-party document generation application through, for example, an API.

Therefore, in such a method 800, the information management software application is somewhat dependent on the third-party document generation application to be used. Whereas, the methods 500 and 700 are much more, if not totally, independent of the third-party document generation application.

Again, the digital data content may comprise text, images, graphics, and/or clipboard objects, in accordance with an embodiment of the present invention. Also, the information management software application may be, for example, a patient management software application. The third-party document generation application may be, for example, a word processing software application or a slide presentation software application.

An embodiment of the present invention provides a computer-readable medium having computer-executable instructions for performing a method on a computer-based platform. The method comprises opening and displaying a data drop window. The method further comprises selecting and displaying a representation of a predefined document layout within the data drop window. The method also comprises selecting a first digital file having a first digital data content. The method further comprises dragging and dropping the selected first digital file into a displayed first data holder location of the displayed document layout representation within the data drop window such that the first data holder location of the displayed document layout representation is populated with the first digital data content. The method also comprises communicating with a third-party document generation application via at least one application program interface (API) such that the at least one API directs the third-party document generation application to generate a third-party document based on the populated document layout representation within the data drop window. The method may further comprise dragging and dropping (or pasting from a clipboard) additional digital files, having digital data content, in a similar manner.

Again, the digital data content may comprise text, images, graphics, and/or clipboard objects, in accordance with an embodiment of the present invention. Also, the information management software application may be, for example, an insurance management software application. The third-party document generation application may be, for example, a word processing software application or a slide presentation software application.

In accordance with various embodiments of the present invention, the computer-readable medium may comprise a hard disk, a floppy disk, a compact disk (CD), a memory stick, a digital video disk (DVD), or any other type of computer-readable medium capable of having the computer-executable instructions as described herein.

A user may often find him or her self manually copying and pasting information from a first document associated with a first software application to one or more other documents associated with one or more other software applications. Such manual copying and pasting can have significant drawbacks including being time consuming, being prone to human error, and needing to be performed often or on a regular basis. Certain embodiments of the present invention, as subsequently described herein, help to alleviate at least some of these drawbacks.

As used herein, the term "data source" refers to any of a digital computer file, a displayed computer window, a data field, a clipboard memory, or any data context from which digital data content is to be pulled or extracted. The term "data target" refers to any of a digital computer file, a displayed computer window, a data field, a clipboard memory, or any data context to which digital data content is to be populated. A data field may or may not be derived from a file, for example. In general, a file is data that is saved to a permanent storage device. Making modifications to the contents of a data source or a data target does not necessarily modify a corresponding source file or target file until the modified data contents is saved as a file.

A data source is associated with a source software application and a data target is associated with a target software application. For example, a word processing document may be a data source or include data sources (e.g., source windows) associated with a word processing software application which is a source software application. Similarly, a spreadsheet document may be a data target or include data targets (e.g., target data fields) associated with a spreadsheet software application that is a target software application. It may be desirable to transfer information (digital data content) from the word processing data source to the spreadsheet data source in a pre-defined manner. This transfer of information may be required to be performed on a regular basis for the same or similar word processing documents and spreadsheet documents in the same pre-defined manner. For example, the word processing document may represent a patient medical record and the spreadsheet document may represent a billing record associated with that same patient.

One embodiment of the present invention comprises a method of transferring information from a data source to at least one data target. The method includes launching a service software application on a processor-based platform. The method further includes the service software application enabling the grabbing of digital data content from a data source and the populating of the digital data content into at least one data target according to a pre-defined mapping in at least a semi-automatic manner. As used herein, the term "in at least a semi-automatic manner" means that at least some of, if not all of, the operations or steps performed to accomplish the transferring of information from a data source to a data target are automatic.

Another embodiment of the present invention comprises a physical computer-readable medium encoded with computer-executable instructions constituting a service software application for transferring information from a data source to at least one data target. The computer-executable instructions include program code for enabling the grabbing of digital data content from a data source and the populating of the digital data content into at least one data target according to a pre-defined mapping in at least a semi-automatic manner.

Figure 9:
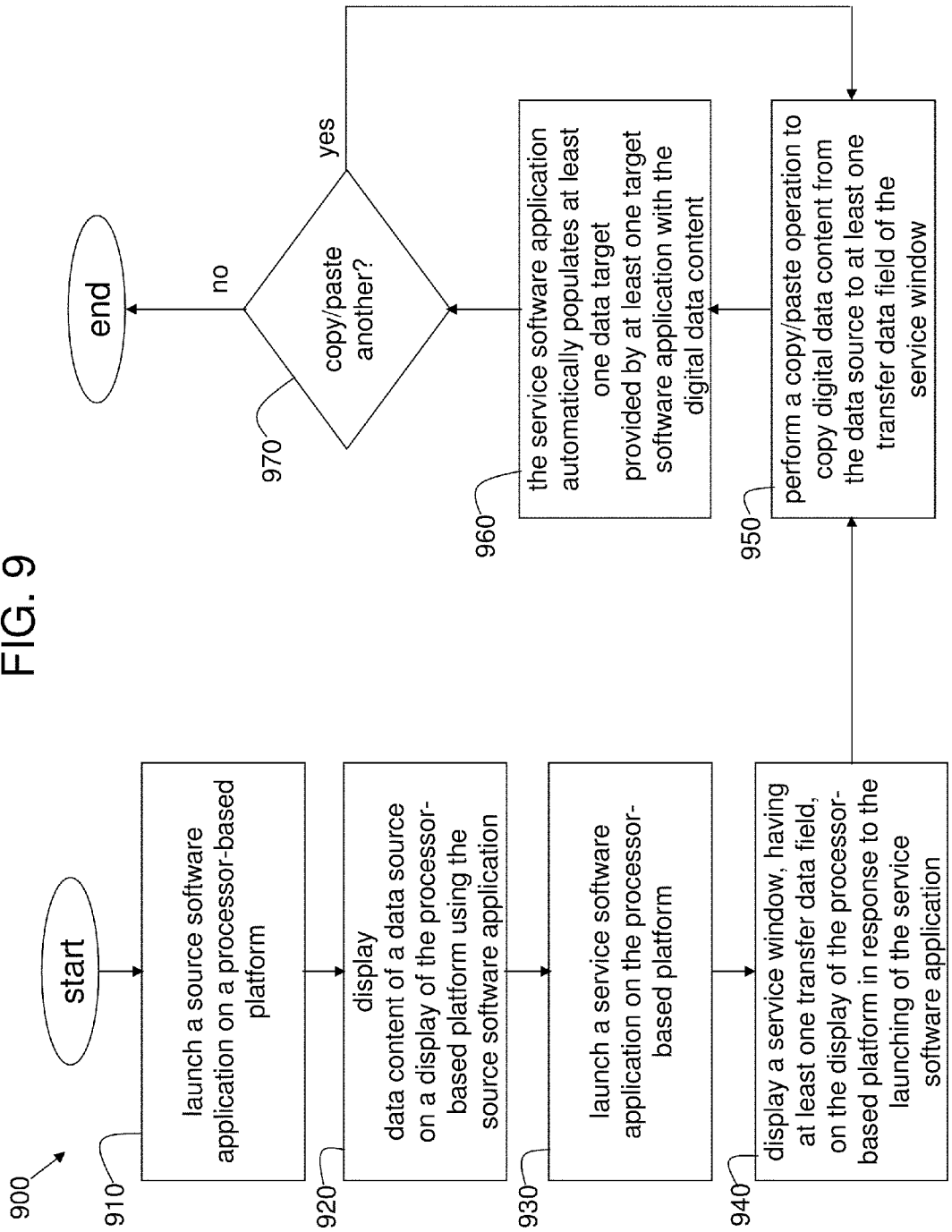
FIG. 9 is a flowchart of a first example embodiment of a method of transferring information from a data source to at least one data target.

FIG. 9 is a flowchart of a first example embodiment of a method 900 of transferring information from a data source to at least one data target, in accordance with an embodiment of the present invention. Steps 910 and 920 of the method 900 include launching a source software application on a processor-based platform and displaying data content of a data source on a display of the processor-based platform using the source software application. The source software application may be, for example, a word processing software application or an email software application. Other source software applications are possible as well. As used herein, the term processor-based platform means any hardware platform (e.g., a personal computer) having at least one hardware processor (e.g., a microprocessor) capable of executing programmed software instructions.

Steps 930 and 940 of the method 900 include launching a service software application on the processor-based platform and displaying a service window, having at least one transfer data field, on the display of the processor-based platform in response to launching the service software application.

In step 950 of the method 900, a copy/paste operation is performed to copy digital data content from the data source to at least one transfer data field of the service window. The digital data content may include, for example, text data, image data, graphics data (e.g., optical character read (OCR) graphics data), and a clipboard object. The step 950 of performing the copy/paste operation is performed manually by a user of the processor-based platform, in accordance with an embodiment of the present invention. Alternatively, the step 950 of performing the copy/paste operation is automatically performed by a pre-defined macro called by the service software application.

In step 960 of the method 900, the service software application automatically populates at least one data target provided by at least one target software application with the digital data content that was copied/pasted into the transfer data field of the service window. The target software application may be, for example, an information management software application or a medical records software application. Other target software applications are possible as well.

In accordance with an embodiment of the present invention, the transfer data field is pre-linked (e.g., mapped) to the data target by the service software application to accomplish the automatic populating. That is, the service software application is programmed to "know" to populate a particular data target with data content pasted into a particular transfer data field. In step 970 of the method 900, if a user desires to copy/paste another digital data content, the method 900 reverts back to step 950. Otherwise, the method ends.

In accordance with an embodiment of the present application, the step 930 of launching the service software application occurs automatically in response to the step 910 of launching the source software application, or in response to the step 920 of displaying data content of a data source. The step 960 of the service software application automatically populating occurs in response to the step 950 of performing the copy/paste operation, in accordance with an embodiment of the present invention. The step 960 of the service software application automatically populating includes the service software application automatically launching the target software application. Alternatively, launching the target software application is performed (e.g., manually performed by a user) before the step 960 of the service software application automatically populating.

In accordance with an embodiment of the present invention, the method 900 may further include a step of positioning the service window over the data target before the step 960 of the service software application automatically populating such that the positioning determines which data target to populate.

Figure 10:
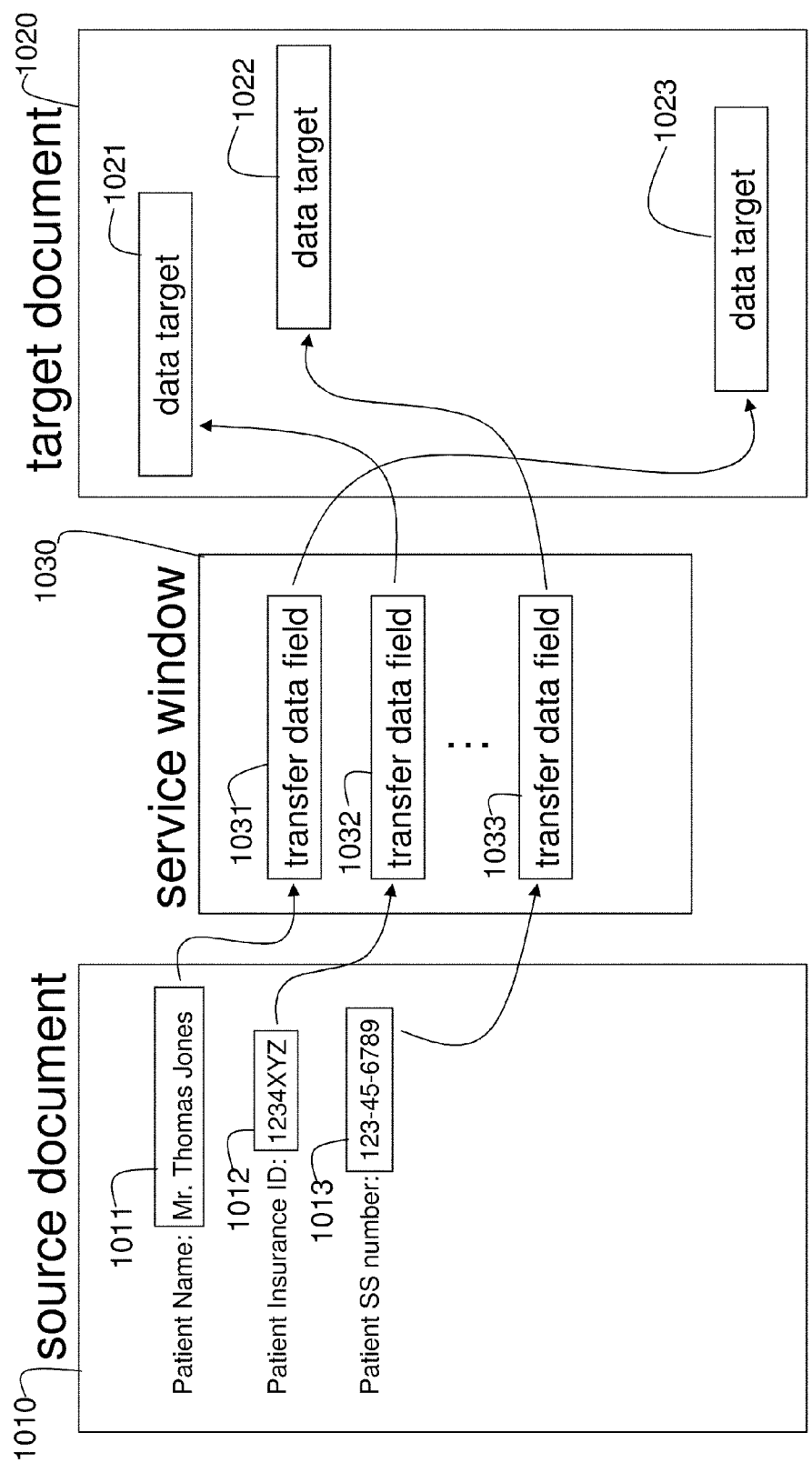
FIG. 10 is a first representative illustration of the relationships between elements used on a processor-based platform to transfer information from a data source to at least one data target, using the method of FIG. 9.

FIG. 10 is a first representative illustration of the relationships between elements used on a processor-based platform to transfer information from a source document 1010 to at least one target document 1020, using the method 900 of FIG. 9. When a source software application is launched on a processor-based platform and the source document 1010 is opened and displayed, various data content is shown. For example, referring to the source document 1010 of FIG. 10, a patient name (e.g., Mr. Thomas Jones) is displayed in a first source data field 1011 (i.e., a first data source) of the source document 1010, a patient insurance ID (e.g., 1234XYZ) is displayed in a second source data field 1012 (i.e., a second data source) of the source document 1010, and a patient social security number (e.g., 123-45-6789) is displayed in a third source data field 1013 (i.e., a third data source) of the source document 1010.

A service window 1030 is displayed as a result of launching a service software application. The service window 1030 includes a plurality of transfer data fields. When a target software application is launched on the processor-based platform and the target document 1020 is opened and displayed, various target data fields (i.e., data targets) are shown. In accordance with an embodiment of the present invention, the target data field 1021 of the target document 1020 is pre-linked to the transfer data field 1032 of the service window 1030 by the service software application. Similarly, the target data field 1022 is pre-linked to the transfer data field 1033, and the target data field 1023 is pre-linked to the transfer data field 1031.

When the data content "Mr. Thomas Jones" is copied from the source data field 1011 and pasted into the transfer data field 1031, the target data field 1023 is automatically populated with the data content "Mr. Thomas Jones" by the service software application. Similarly, when the data content "1234XYZ" is copied from the source data field 1012 and pasted into the transfer data field 1032, the target data field 1021 is automatically populated with the data content "1234XYZ" by the service software application. Also, when the data content "123-45-6789" is copied from the source data field 1013 and pasted into the transfer data field 1033, the target data field 1022 is automatically populated with the data content "123-45-6789" by the service software application.

In accordance with an embodiment of the present invention, other target documents may be opened as well, corresponding to the same or other target software applications, and having target data fields (i.e., data targets) pre-linked to the transfer data fields of the service window by the service software application. In such an embodiment, the data content is copied from the source document 1010 and pasted to the service window 1030 only once. However, all the pre-linked target data fields for all the target documents are automatically populated based on this one-time copy/paste scenario.

Figure 11:
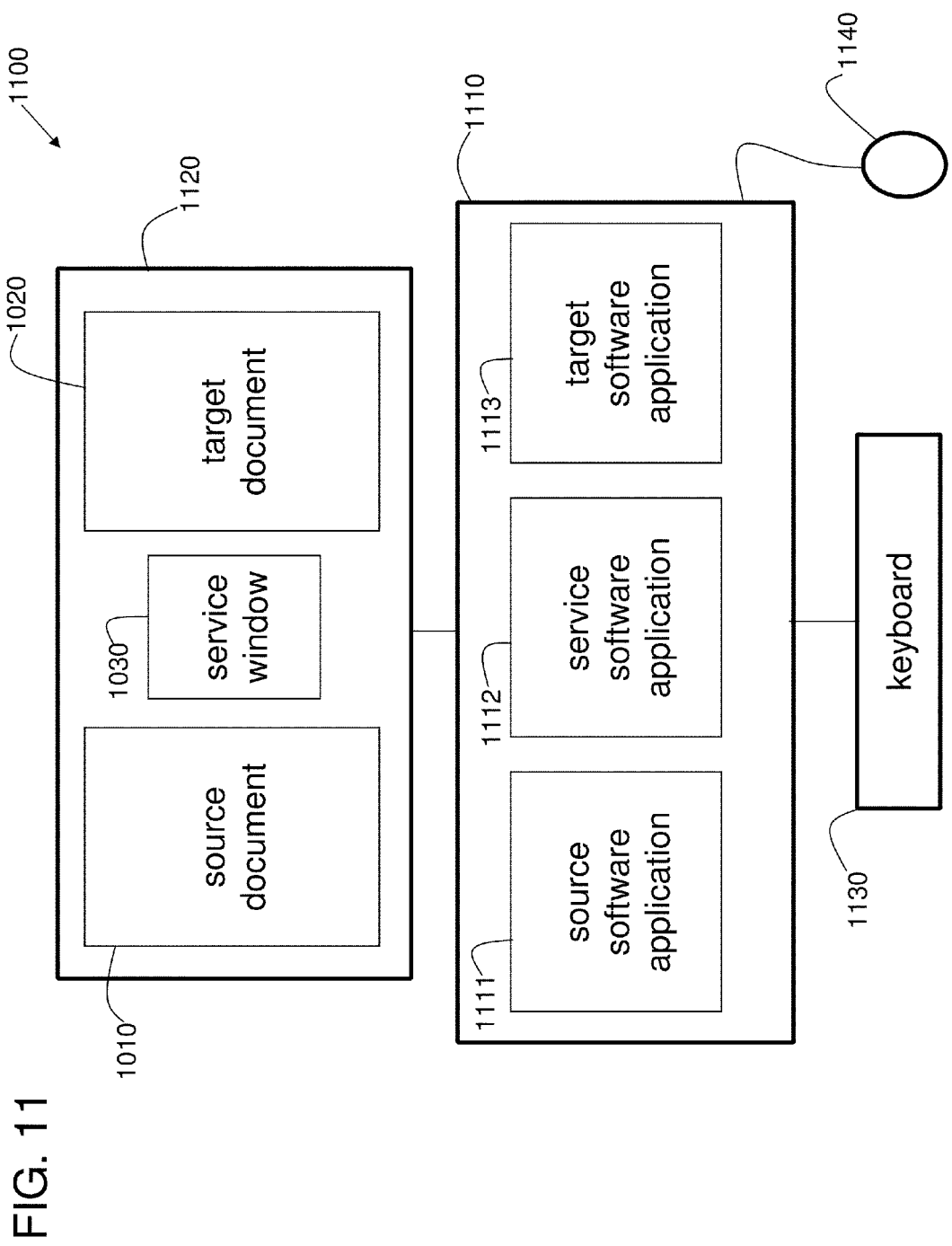
FIG. 11 is a schematic illustration of a first example embodiment of a processor-based platform used to transfer information from a data source to at least one data target using the elements of FIG. 10 and the method of FIG. 9.

FIG. 11 is a schematic illustration of a first example embodiment of a processor-based platform 1100 used to transfer information from a source document 1010 to at least one target document 1020 using the elements of FIG. 10 and the method 900 of FIG. 9. The processor-based platform 1100 includes a computer-based component 1110 including processing-capability (e.g., at least one processor) and memory for storing and executing the software applications. The processor-based platform 1100 also includes a display 1120, a keyboard 1130, and a computer mouse 1140, all operationally connected to the computer-based component 1110. The processor-based platform 1100 may be any standard, custom, and/or commercially available hardware platform capable of executing a source software application 1111, a service software application 1112, and at least one target software application 1113. In accordance with an embodiment of the present invention, the processor-based platform may be a combination of networked hardware components including, for example, a personal computer or work station, a server, and a database storage means. The term "processor-based platform" and the term "computer-based platform" are used interchangeably herein.

In accordance with an embodiment of the present invention, a physical computer-readable medium is encoded with computer-executable instructions constituting a service software application for transferring information from a source document 1010 to at least one target document 1020. The computer-executable instructions include program code for displaying a service window 1030, having at least one transfer data field (e.g., 1031), on a display 1120 of a computer-based platform 1100. The computer-executable instructions also include program code for performing a copy/paste operation to copy first digital data content (e.g., the text data "Mr. Thomas Jones") from a first source data field (e.g., 1011) provided by a source software application 1111 to at least one transfer data field (e.g., 1031) of the service window 1030. The computer-executable instructions further include program code for automatically populating at least one target data field (e.g., 1023) of at least one target software application 1113 with the first digital data content (e.g., the text data "Mr. Thomas Jones"). In accordance with various embodiments of the present invention, the physical computer-readable medium may include a hard disk, a floppy disk, a compact disk (CD), a memory stick, a digital video disk (DVD), or any other type of physical computer-readable medium capable of storing or having recorded thereon the computer-executable instructions as described herein. However, the physical computer-readable medium does not include a computer-readable transmission medium such as, for example, an electromagnetic signal.

Figure 12:
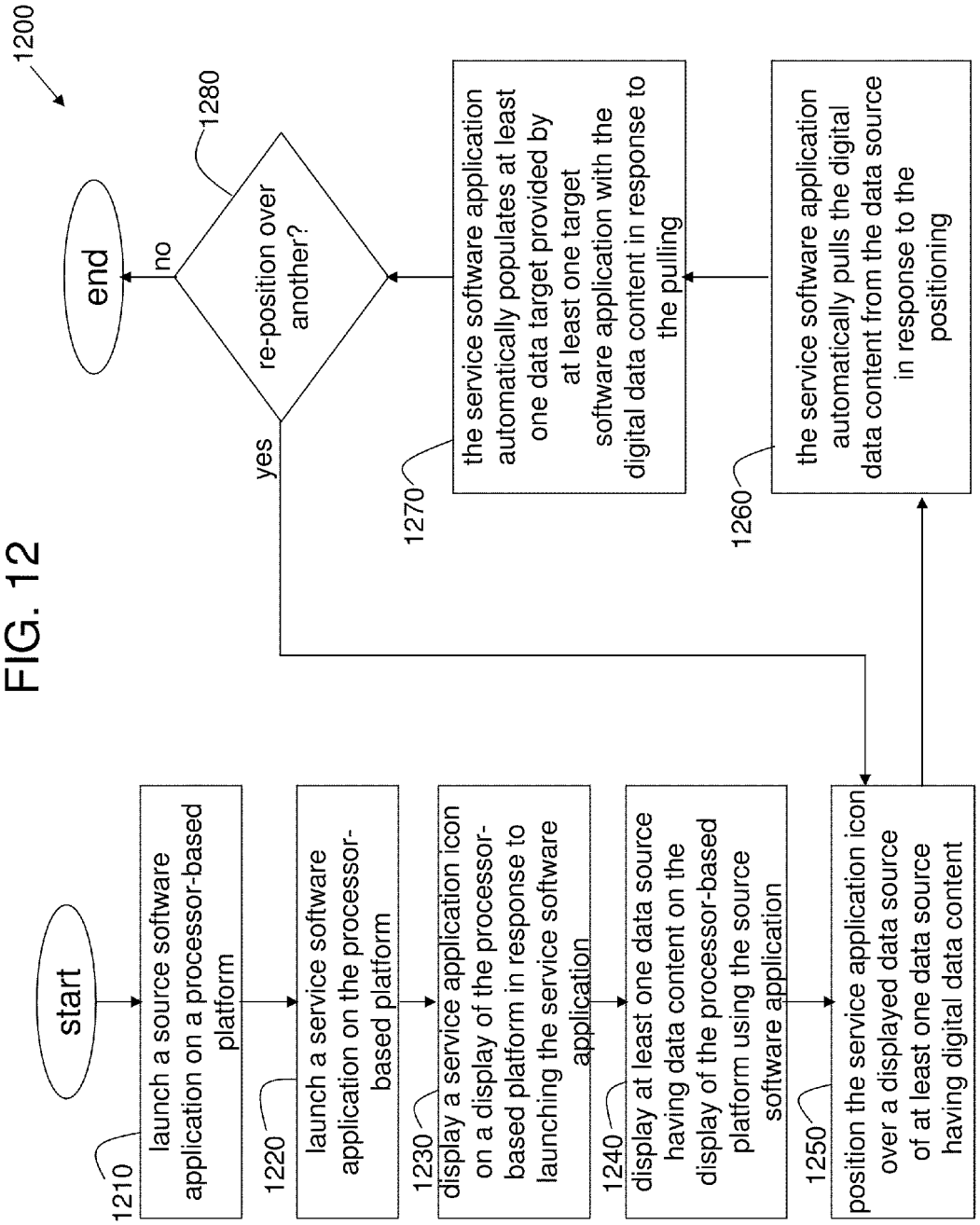
FIG. 12 is a flowchart of a second example embodiment of a method of transferring information from a data source to at least one data target.

FIG. 12 is a flowchart of a second example embodiment of a method 1200 of transferring information from a data source to at least one data target, in accordance with an embodiment of the present invention. Steps 1210 and 1220 of the method 1200 include launching a source software application on a processor-based platform and launching a service software application on the processor-based platform. The source software application may be, for example, a database software application or a spreadsheet software application. Other source software applications are possible as well. The step 1220 of launching the service software application occurs automatically in response to the step 1210 of launching the source software application, in accordance with an embodiment of the present application. The step 1220 of launching the service software application is performed manually by a user, in accordance with another embodiment of the present invention.

In step 1230, display a service application icon on a display of the processor-based platform in response to launching the service software application. In step 1240, display at least one data source having data content on the display of the processor-based platform using the source software application. The service application icon corresponds to the service software application.

In step 1250, position (e.g., drag and drop) the service application icon over a displayed data source of at least one data source having digital data content. In step 1260, the service software application automatically pulls the digital data content from the data source in response to positioning of the service application icon over the displayed data source. The digital data content may include, for example, text data, image data, graphics data (e.g., optical character read (OCR) graphics data), and a clipboard object.

In step 1270, the service software application automatically populates at least one data target provided by at least one target software application with the digital data content in response to the pulling of the digital data content. The target software application may be, for example, a dental records software application or a patient billing software application. Other target software applications are possible as well.

The step 1270 of the service software application automatically populating includes the service software application automatically launching the target software application, in accordance with an embodiment of the present invention. Alternatively, the target software application may be launched (e.g., manually by a user) before performing the step 1250 of positioning the service application icon.

In accordance with an embodiment of the present invention, the service software application is pre-linked to at least one data target in the target software application. That is, the service software application is programmed to "know" to populate a particular data target with data content pulled from a data source over which the service application icon has been positioned. In step 1280, if a user desires to transfer another digital data content, the method 1200 reverts back to step 1250. Otherwise, the method ends.

Figure 13:
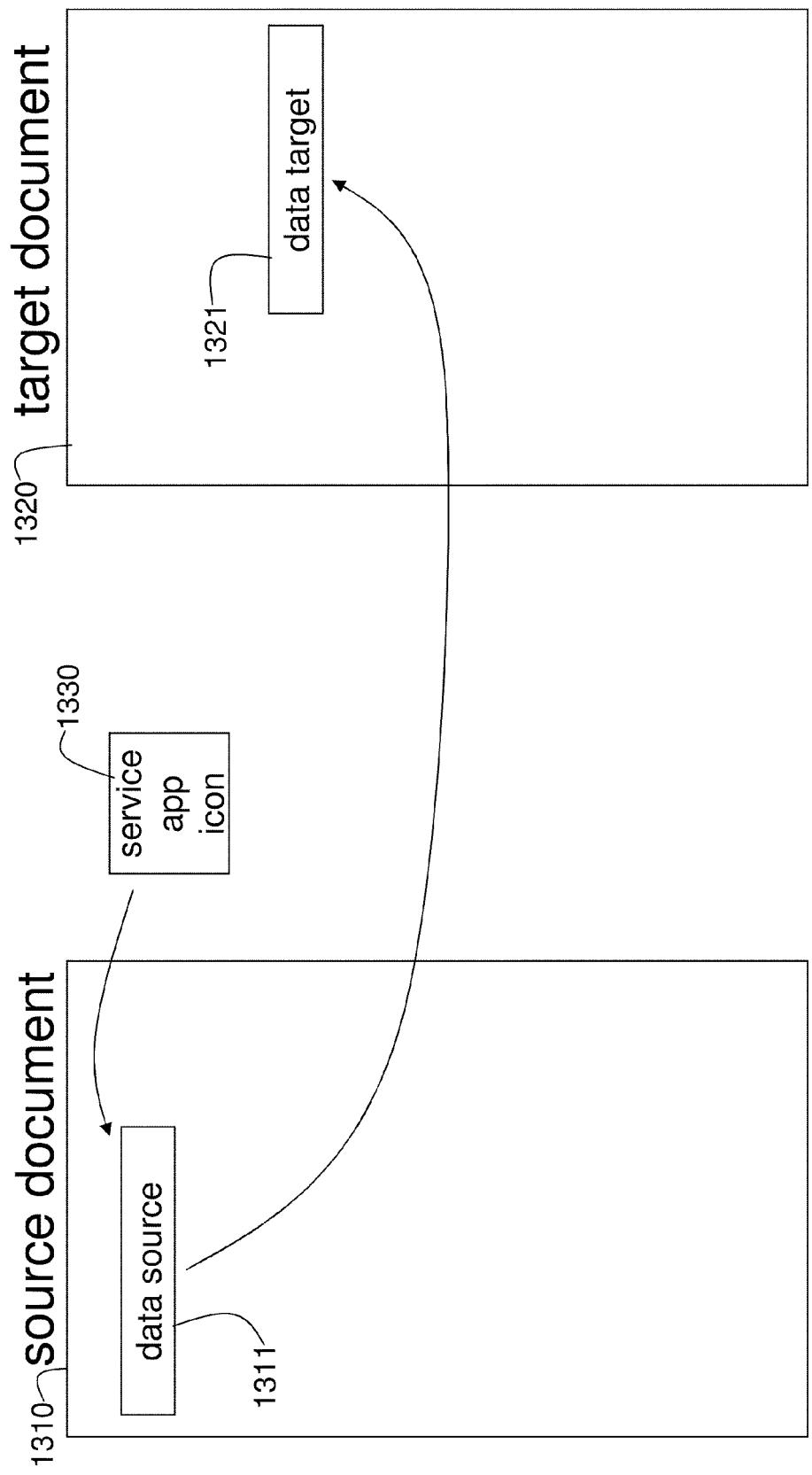
FIG. 13 is a second representative illustration of the relationships between elements used on a processor-based platform to transfer information from a data source to at least one data target, using the method of FIG. 12.

FIG. 13 is a second representative illustration of the relationships between elements used on a processor-based platform to transfer information from a source document 1310 to at least one target document 1320, using the method 1200 of FIG. 12. When a source software application is launched on a processor-based platform and the source document 1310 is opened and displayed, various source data fields (i.e., data sources) are shown. For example, the source data field 1311 is shown in FIG. 13. The source data field 1311 may contain any of various types of digital data content such as, for example, text data, image data, and graphics data.

When the service software application is launched on the processor-based platform, a service application icon 1330 is displayed. When a target software application is launched on the processor-based platform and the target document 1320 is opened and displayed, various target data fields (i.e., data targets) are shown. For example, the target data field 1321 is shown in FIG. 13. The service application icon 1330 is pre-linked to the target data field 1321 by the service software application associated with the icon 1330. As a result, when a user positions (e.g., using a computer mouse) the service application icon 1330 over the source data field 1311, the digital data content contained in the source data field 1311 is automatically transferred to the target data field 1321 of the target document 1320.

In accordance with an embodiment of the present invention, other target documents or contexts may be opened as well, corresponding to the same or other target software applications, and having target data fields pre-linked to the service application icon 1330 by the service software application. In such an embodiment, the data content is pulled from the source data field 1311 of the source document only once. However, all the pre-linked target data fields for all the target documents are automatically populated based on this one-time icon positioning and data pulling scenario.

Other service application icons corresponding to the same or other service software applications may be provided as well, in accordance with another embodiment of the present invention. Each service application icon may be linked to different data targets. As a result, a user selects to position a particular service application icon based on the type of data content to be transferred from the data source. For example, a first service application icon may correspond to a patient name. A second service application icon may correspond to a patient ID, and a third service application icon may correspond to a patient social security number.

As an example, a user may desire to transfer a patient social security number from a database source software application to three other target software applications. The user launches the database source software application and a service software application. When the service software application is launched, three service application icons are displayed including a patient name icon, a patient ID icon, and a patient social security number icon. The user proceeds to use a computer mouse to drag and drop the patient social security icon over a data source of the database source software application containing the patient social security number. As a result, the patient social security number is automatically pulled from the data source, the three target software applications are automatically launched, three corresponding target documents are automatically opened, and the pre-linked data targets in the three opened target documents are automatically populated with the patient social security number by the service software application.

Figure 14:
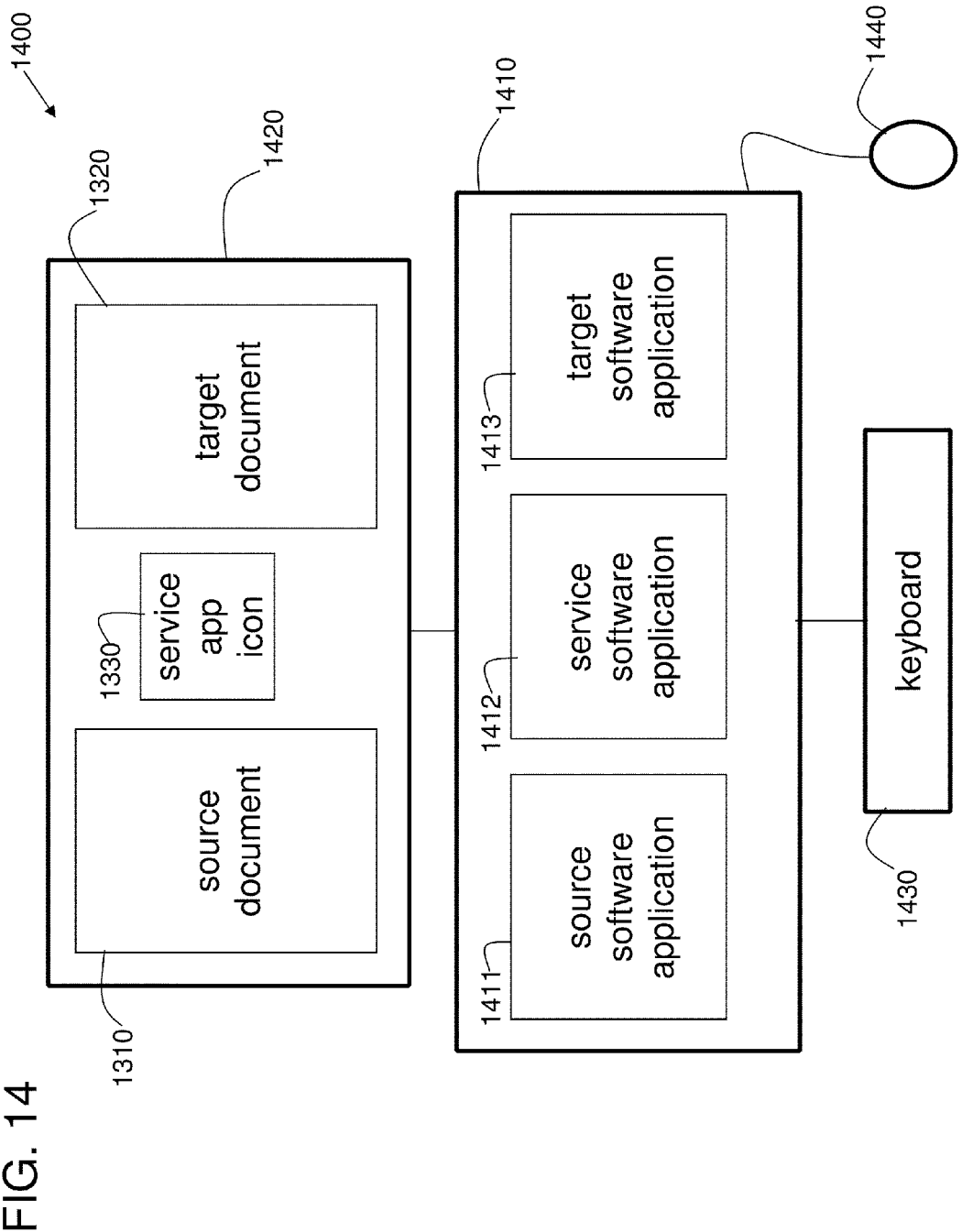
FIG. 14 is a schematic illustration of a second example embodiment of a processor-based platform used to transfer information from a data source to at least one data target using the elements of FIG. 13 and the method of FIG. 12.

FIG. 14 is a schematic illustration of a second example embodiment of a processor-based platform 1400 used to transfer information from a source context 1310 to at least one target context 1320 using the elements of FIG. 13 and the method 1200 of FIG. 12. The processor-based platform 1400 includes a computer-based component 1410 including processing-capability (e.g., at least one processor) and memory for storing and executing the software applications. The processor-based platform 1400 also includes a display 1420, a keyboard 1430, and a computer mouse 1440, all operationally connected to the computer-based component 1410. The processor-based platform 1400 may be any standard, custom, and/or commercially available hardware platform capable of executing a source software application 1411, a service software application 1412, and at least one target software application 1413. In accordance with an embodiment of the present invention, the processor-based platform may be a combination of networked hardware components including, for example, a personal computer or work station, a server, and a database storage means.

In accordance with an embodiment of the present invention, a physical computer-readable medium is encoded with computer-executable instructions constituting a service software application 1412 for transferring information from a source context 1310 to at least one target context 1320. The computer-executable instructions include program code for displaying a service application icon 1330 on a display 1420 of a computer-based platform 1400 in response to launching the service software application 1412 on the computer-based platform 1400. The computer-executable instructions also include program code for automatically pulling a first digital data content from a first source data field (e.g., 1311) of a source context 1310 of a source software application 1411 in response to positioning the service application icon 1330 over the first source data field (e.g., 1311). The computer-executable instructions further include program code for automatically populating at least one target data field (e.g., 1321) of at least one target context 1320 of at least one target software application 1413 with the first digital data content in response to the pulling. In accordance with various embodiments of the present invention, the physical computer-readable medium may include a hard disk, a floppy disk, a compact disk (CD), a memory stick, a digital video disk (DVD), or any other type of physical computer-readable medium capable of storing or having recorded thereon the computer-executable instructions as described herein. However, the physical computer-readable medium does not include a computer-readable transmission medium such as, for example, an electromagnetic signal.

Figure 15:
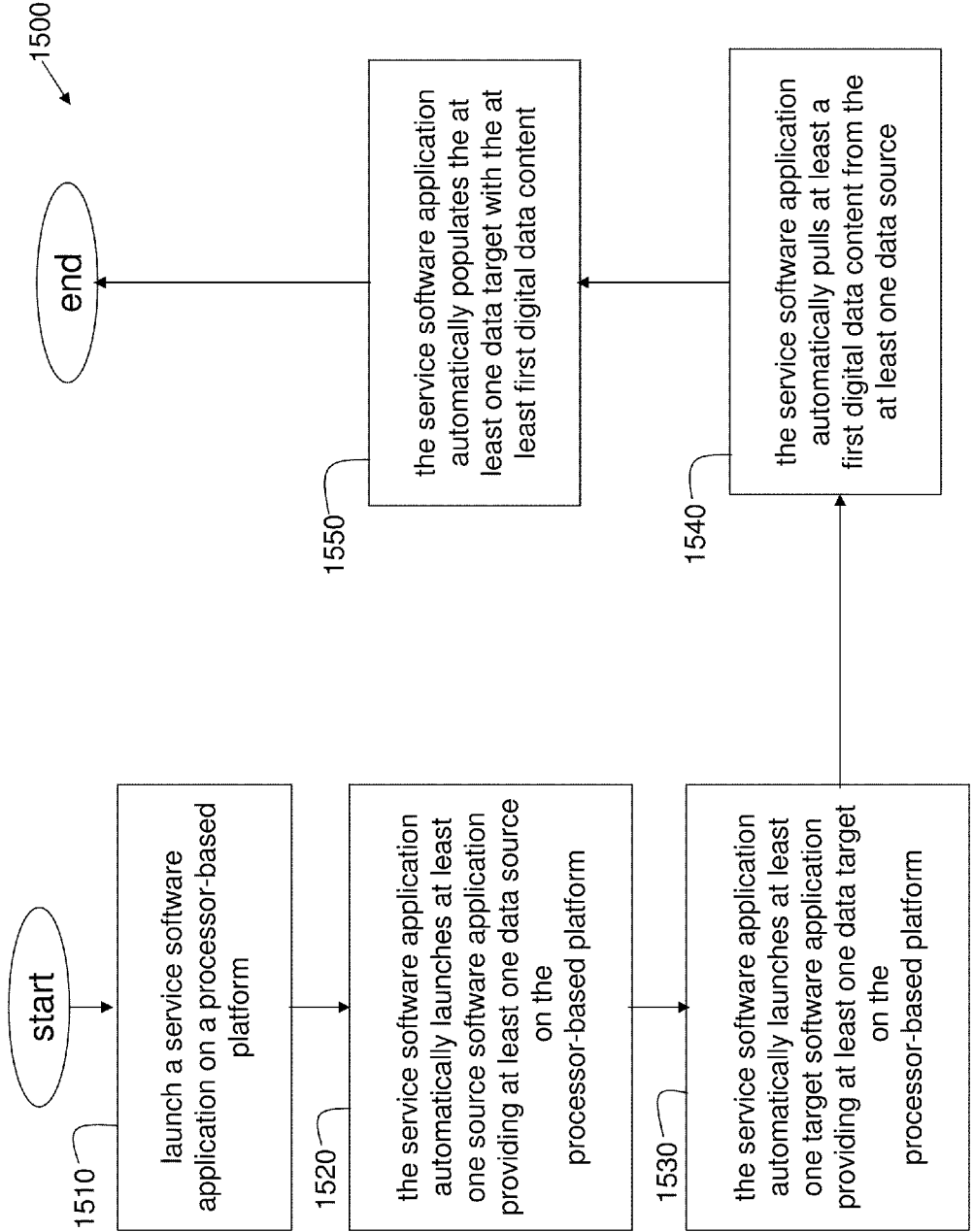
FIG. 15 is a flowchart of a third example embodiment of a method of transferring information from a data source to at least one data target.

FIG. 15 is a flowchart of a third example embodiment of a method 1500 of transferring information from a data source to at least one data target, in accordance with an embodiment of the present invention. In step 1510 of the method 1500, launch a service software application on a processor-based platform. In step 1520, the service software application automatically launches at least one source software application providing at least one data source on the processor-based platform. That is, the service software application is programmed to "know" which source software applications to launch. In step 1530, the service software application automatically launches at least one target software application providing at least one data target on the processor-based platform. That is, the service software application is programmed to "know" which target software applications to launch. In step 1540, the service software application automatically pulls at least a first digital data content from at least one data source. In step 1550, the service software application automatically populates at least one data target with at least first digital data content. The data sources are pre-linked to the data targets by the service software application. That is, the service software application is programmed to "know" to populate particular data targets with data content pulled from particular data sources.

Figure 16:
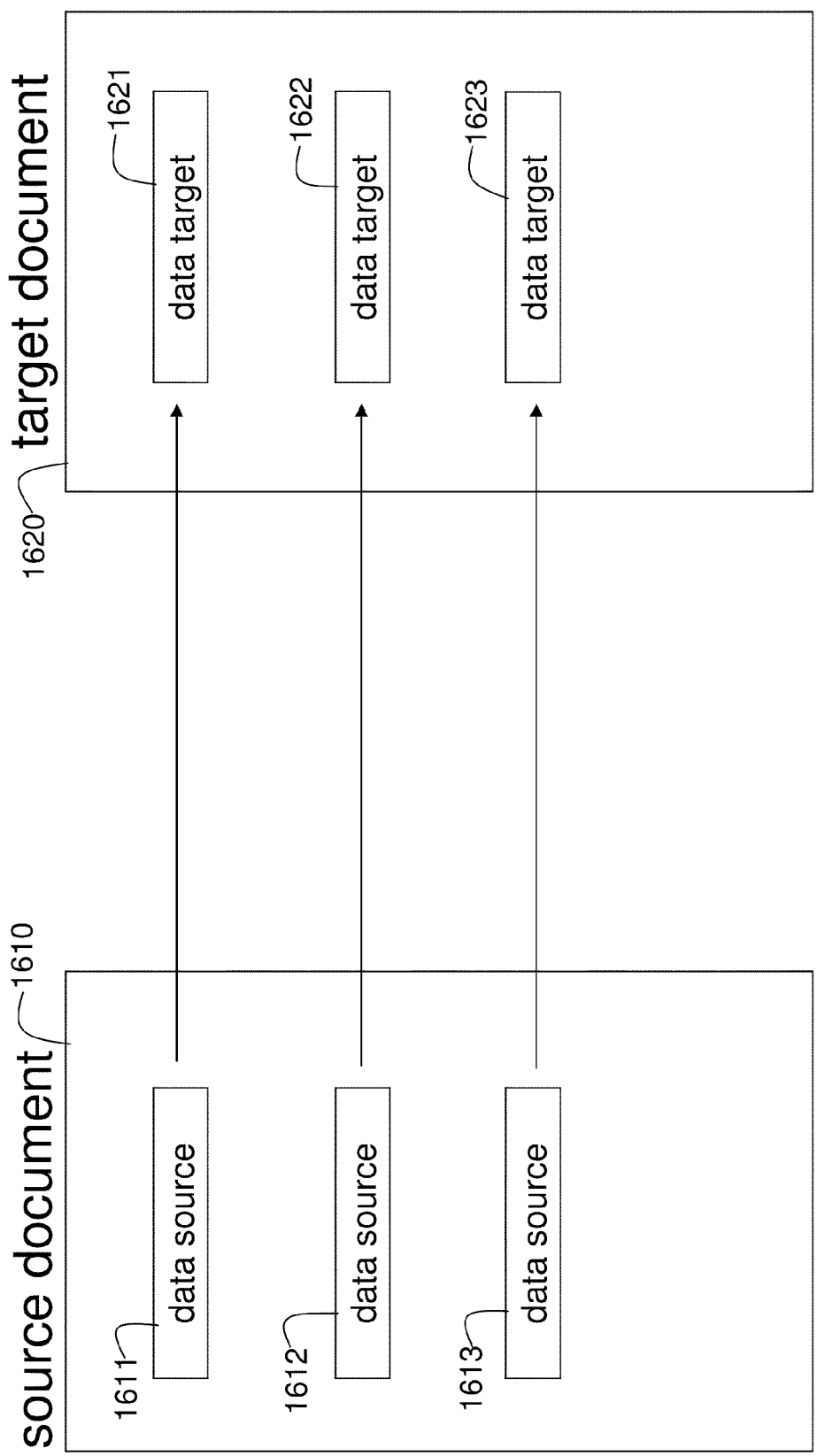
FIG. 16 is a third representative illustration of the relationships between elements used on a processor-based platform to transfer information from a data source to at least one data target, using the method of FIG. 15.

FIG. 16 is a third representative illustration of the relationships between elements used on a processor-based platform to transfer information from a source context 1610 to at least one target context 1620, using the method 1500 of FIG. 15. When a source context 1610 (e.g., a source document) is opened as a result of launching a service software application, the source context 1610 is displayed showing various source data fields (i.e., data sources) containing digital data content. In FIG. 16, three source data fields 1611, 1612, and 1613 are shown. Similarly, when a target context 1620 is opened as a result of launching the service software application, the target context 1620 is displayed showing various target data fields (i.e., data targets) containing digital data content. In FIG. 16, three target data fields 1621, 1622, and 1623 are shown. In the service software application, source data field 1611 is pre-linked to target data field 1621, source data field 1612 is pre-linked to target data field 1622, and source data field 1613 is pre-linked to target data field 1623. That is, the service software application is programmed to "know" to populate the target data fields with data content pulled from the source data fields in this linked manner.

As an example, a user may desire to transfer patient names, patient home addresses, and patient amounts to be billed from a medical records source software application to a billing target software application. The user launches the appropriate service software application for performing the transfer task. When the service software application is launched, the medical records source software application is automatically launched and the billing target software application is automatically launched. A medical records source document is automatically opened and a billing target document is automatically opened. The service software application automatically pulls the patient name, patient home address, and patient amount to be billed (i.e., digital data content) for each patient from the appropriate source data fields in the opened medical records source document and proceeds to automatically populated the corresponding (i.e., linked) target data fields in the opened billing target document with the pulled digital data content. In this way, a user can easily create billing statements to send to patients simply by keeping the medical records source file up to date and then launching the service software application (e.g., at the end of the month).

Figure 17:
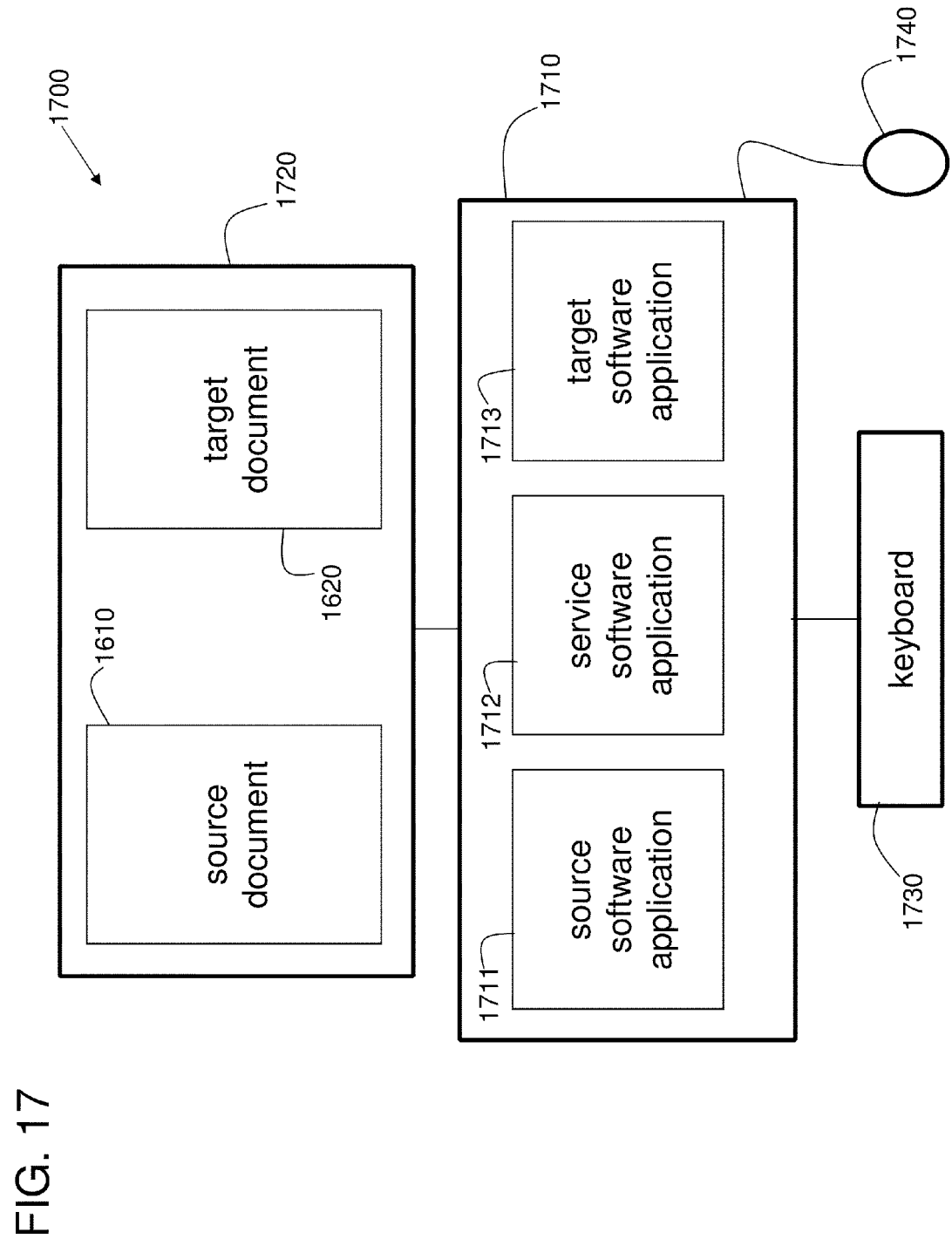
FIG. 17 is a schematic illustration of a third example embodiment of a processor-based platform used to transfer information from a data source to at least one data target using the elements of FIG. 16 and the method of FIG. 15.

FIG. 17 is a schematic illustration of a third example embodiment of a processor-based platform 1700 used to transfer information from a source context 1610 to at least one target context 1620 using the elements of FIG. 16 and the method 1500 of FIG. 15. The processor-based platform 1700 includes a computer-based component 1710 including processing-capability (e.g., at least one processor) and memory for storing and executing the software applications. The processor-based platform 1700 also includes a display 1720, a keyboard 1730, and a computer mouse 1740, all operationally connected to the computer-based component 1710. The processor-based platform 1700 may be any standard, custom, and/or commercially available hardware platform capable of executing at least one source software application 1711, a service software application 1712, and at least one target software application 1713. In accordance with an embodiment of the present invention, the processor-based platform may be a combination of networked hardware components including, for example, a personal computer or work station, a server, and a database storage means.

In accordance with an embodiment of the present invention, a physical computer-readable medium is encoded with computer-executable instructions constituting a service software application 1712 for transferring information from at least one source context 1610 to at least one target context 1620. The computer-executable instructions include program code for automatically launching at least one source software application 1711 and opening at least one source context 1610 (e.g., a source document), having at least one source data field (e.g., 1611), within the at least one source software application 1711. The computer-executable instructions also include program code for automatically launching at least one target software application 1713 and opening at least one target context 1620, having at least one target data field (e.g., 1621), within the at least one target software application 1713. The computer-executable instructions further include program code for automatically pulling at least a first digital data content from at least one source data field (e.g., 1611) of at least one source context 1610, and automatically populating at least one target data field (e.g., 1621) of at least one target context 1620 with at least first digital data content. In accordance with various embodiments of the present invention, the physical computer-readable medium may include a hard disk, a floppy disk, a compact disk (CD), a memory stick, a digital video disk (DVD), or any other type of physical computer-readable medium capable of storing or having recorded thereon the computer-executable instructions as described herein. However, the physical computer-readable medium does not include a computer-readable transmission medium such as, for example, an electromagnetic signal.

Figure 18:
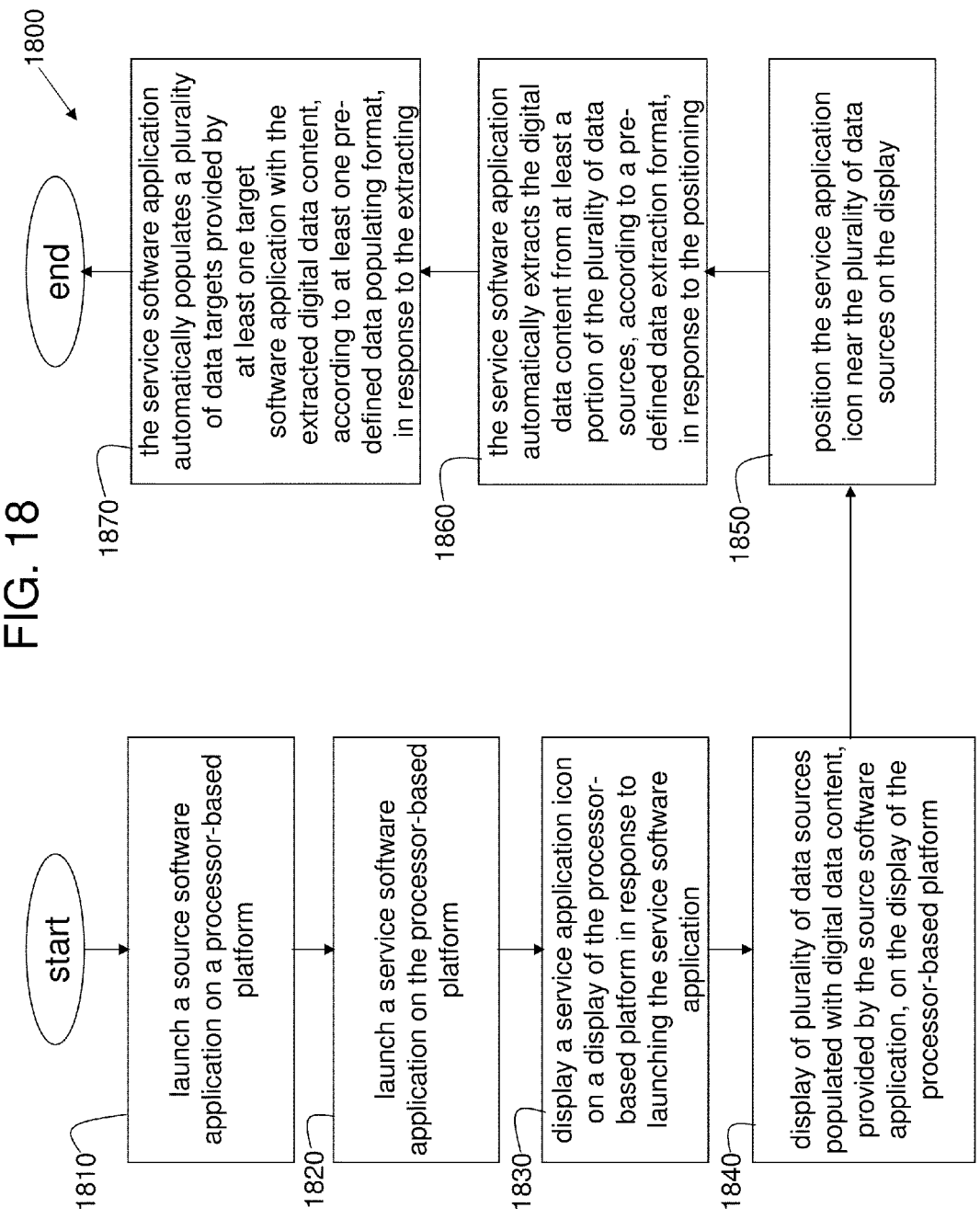
FIG. 18 is a flowchart of a fourth example embodiment of a method of transferring information from a data source to at least one data target.

FIG. 18 is a flowchart of a fourth example embodiment of a method 1800 of transferring information from a source context to at least one target context. In step 1810 of the method 1800, launch a source software application on a processor-based platform. In step 1820, launch a service software application on the processor-based platform. In step 1830, display a service application icon on a display of the processor-based platform in response to launching the service software application. In step 1840, display a plurality of data sources populated with digital data content, provided by the source software application, on the display of the processor-based platform. In step 1850, position the service application icon near the plurality of data sources on the display. In step 1860, the service software application automatically extracts the digital data content from at least a portion of the plurality of data sources, according to a pre-defined data extraction format, in response to the positioning. In step 1870, the service software application automatically populates a plurality of data targets provided by at least one target software application with the extracted digital data content, according to a pre-defined data populating format, in response to the extracting. The service software application is pre-linked to the target software application, in accordance with an embodiment of the present invention. That is, the service software application is programmed to "know" which target software application to launch and which data targets to populate, according to the data populating format.

The step 1820 of launching the service software application occurs automatically in response to the step 1810 of launching the source software application, in accordance with an embodiment of the present invention. The step 1870 of the service software application automatically populating includes the service software application automatically launching the target software application, in accordance with an embodiment of the present invention. Alternatively, the method 1800 may further include launching the target software application before performing the step 1850 of positioning the service application icon.

Figure 19:
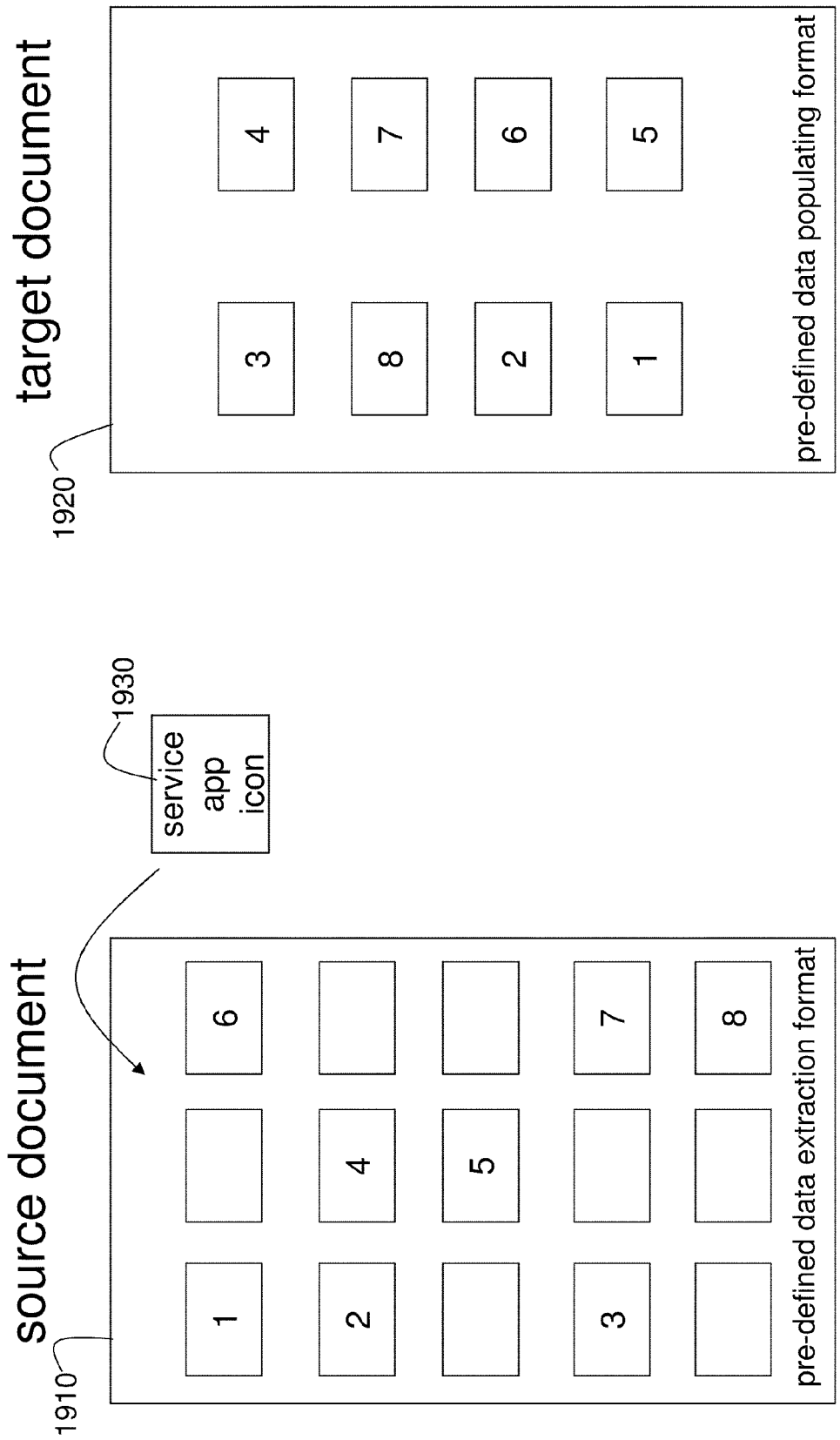
FIG. 19 is a fourth representative illustration of the relationships between elements used on a processor-based platform to transfer information from a data source to at least one data target, using the method of FIG. 18.

FIG. 19 is a fourth representative illustration of the relationships between elements used on a processor-based platform to transfer information from a source context 1910 to at least one target context 1920, using the method 1800 of FIG. 18. The source context 1910 shows a plurality of source data fields (i.e., data sources) having digital data content. In FIG. 19, the source data fields happen to be arranged in a 3×5 matrix (i.e., fifteen source data fields). However, the service software application is programmed to extract only eight of the fifteen source data fields according to a pre-defined data extraction format. When the service application icon 1930 is positioned by a user over the source context 1910, the service software application extracts the digital data content from the source data fields labeled 1 through 8 in FIG. 19 (i.e., according to the pre-defined data extraction format). In response to extracting the digital data content according to the pre-defined data extraction format, the service software application populates eight target data fields (i.e., data targets) of the target context 1920 with the extracted digital data content, according to a pre-defined data populating format. The labeled target data fields 1 through 8 correspond to the labeled source data fields 1 through 8 and define the data populating format. For example, the digital data content in the source data field labeled "1" in the upper left corner of the source context 1910 is populated into the target data field labeled "1" in the lower left corner of the target context 1920. The service software application is programmed to "know" the data extraction format and the data populating format.

As an example, referring to FIG. 19, the source document 1910 contains a plurality of data sources containing information related to a particular patient. However, the service software application corresponding to the service application icon 1930 is programmed to extract only that information (digital data content) in the data sources labeled 1 through 8, according to a pre-defined data extraction format, since those data sources correspond to information needed for billing the patient. The service software application is further programmed to populate the data targets of the target document 1920 according to a pre-defined data populating format which completes a standard billing form. In this manner, a patient billing form (target document 1920) may be easily created from the information that already exists in the source document 1910.

Figure 20:
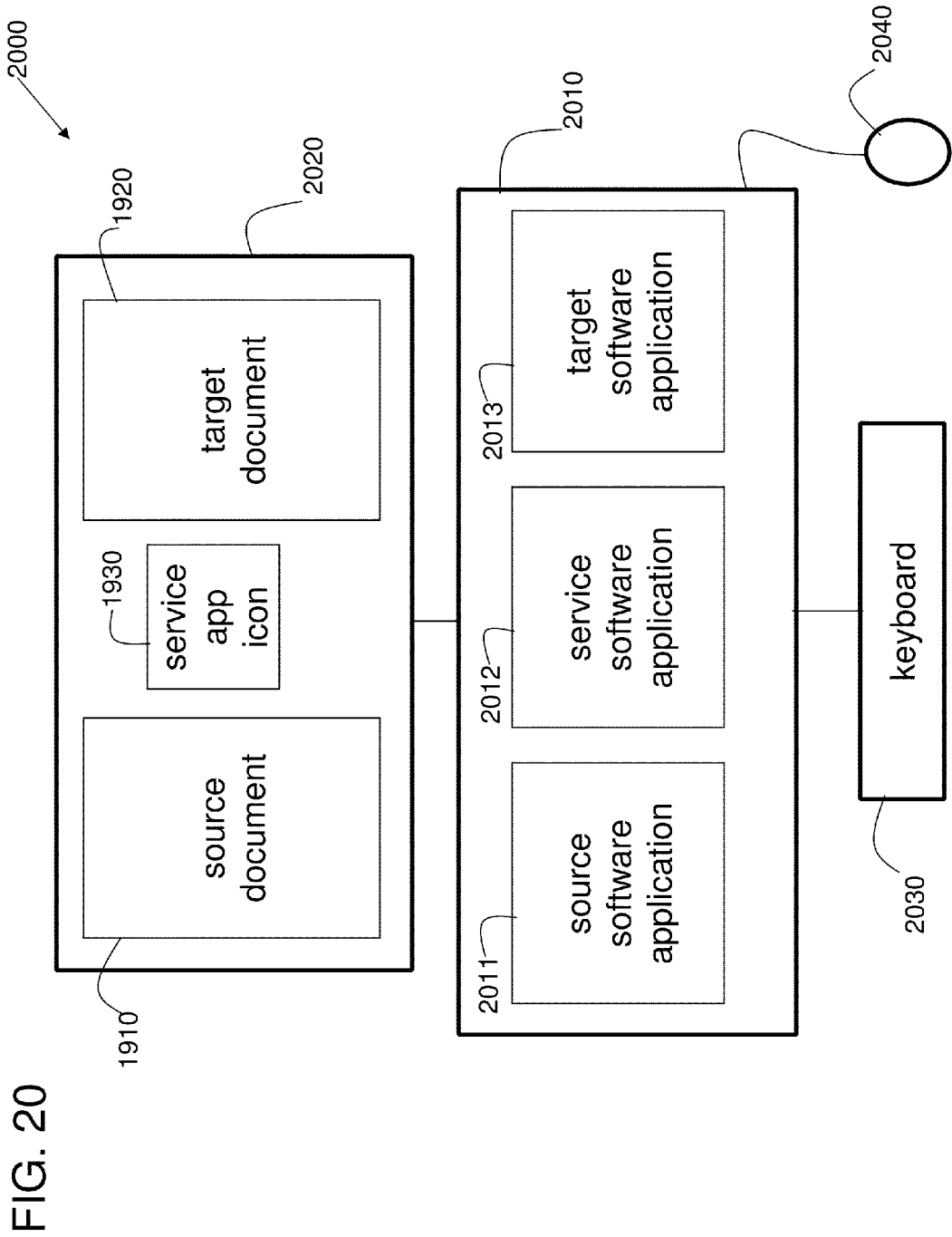
FIG. 20 is a schematic illustration of a fourth example embodiment of a processor-based platform used to transfer information from a data source to at least one data target using the elements of FIG. 19 and the method of FIG. 19.

FIG. 20 is a schematic illustration of a fourth example embodiment of a processor-based platform 2000 used to transfer information from a source context 1910 to at least one target context 1920 using the elements of FIG. 19 and the method 1800 of FIG. 18. The processor-based platform 2000 includes a computer-based component 2010 including processing-capability (e.g., at least one processor) and memory for storing and executing the software applications. The processor-based platform 2000 also includes a display 2020, a keyboard 2030, and a computer mouse 2040, all operationally connected to the computer-based component 2010. The processor-based platform 2000 may be any standard, custom, and/or commercially available hardware platform capable of executing a source software application 2011, a service software application 2012, and at least one target software application 2013. In accordance with an embodiment of the present invention, the processor-based platform may be a combination of networked hardware components including, for example, a personal computer or work station, a server, and a database storage means.

In accordance with an embodiment of the present invention, a physical computer-readable medium is encoded with computer-executable instructions constituting a service software application 2012 for transferring information from at least one source context 1910 to at least one target context 1920. The computer-executable instructions include program code for displaying a service application icon 1930 on a display 2020 of a computer-based platform 2000 in response to launching the service software application 2012 on the computer-based platform 2000. The computer-executable instructions also include program code for automatically extracting digital data content from a plurality of data sources provided by a source software application 2011, according to a pre-defined data extraction format, in response to positioning the service application icon 1930 over the source context 1910 on the display 2020 of the computer-based platform 2000. The computer-executable instructions further include program code for automatically populating a plurality of data targets provided by at least one target software application 2013 with the extracted digital data content, according to at least one pre-defined data populating format, in response to the extracting. In accordance with various embodiments of the present invention, the physical computer-readable medium may include a hard disk, a floppy disk, a compact disk (CD), a memory stick, a digital video disk (DVD), or any other type of physical computer-readable medium capable of storing or having recorded thereon the computer-executable instructions as described herein. However, the physical computer-readable medium does not include a computer-readable transmission medium such as, for example, an electromagnetic signal.

In accordance with an embodiment of the present invention, an auto-windows focusing capability is provided. When data content is transferred from a data source to a data target, a window containing or being the data target automatically comes to the forefront on the display of the processor-based platform in response to the data content transfer. In this manner, a user may readily verify the correct transfer of the data content.

In accordance with another embodiment of the present invention, a macro may be run in a target location. For example, data is extracted from a data source and then the extracted data is formatted. The formatted data is placed on a clipboard or saved to a file. A macro is executed, for example, in a Windows® document which automatically imports the formatted data into a data target. The macro performs a sequence of operations (e.g., a sequence of data insertions).

In accordance with a further embodiment of the present invention, data content is pulled or extracted from two or more different source software applications. The pulled or extracted data is then combined and placed on the clipboard or populated into a single target software application. In general, in accordance with certain embodiments of the present application, the clipboard may be used as an intermediary data content placeholder between at least one source software application and at least one target software application.

In general, in accordance with certain embodiments of the present application, data content that is extracted or pulled from a data source may be modified (e.g., analyzed, re-formatted, combined, and/or parsed) before being populated into one or more data targets. For example, referring to FIG. 10, the data content "Mr. Thomas Jones" may be extracted from the data source 1011, re-formatted by the service software application 1112 as "Jones, T.", and populated into data target 1023. As another example, the data content "Mr. Thomas Jones" may be extracted from the data source 1011, parsed by the service software application 1112 as "Thomas" and "Jones", where "Thomas" is populated to the data target 1021 and "Jones" is populated to the data target 1022.

In summary, embodiments of the present invention provide systems and methods for transferring information from at least one source context to at least one target context, and associated physical computer-readable medium. A service software application is used on a processor-based platform to transfer digital data content from at least one data source to at least one data target in at least a semi-automatic manner. The data source is associated with a source software application and the data target is associated with a target software application. The digital data content includes, for example, text data, image data, graphics data, or a clipboard object.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method of transferring information from a data source to at least one data target, said method comprising:
   launching a source software application on a processor-based platform;
   launching a service software application on said processor-based platform;
   displaying a service application icon on a display of said processor-based platform in response to said launching of said service software application;
   displaying at least one data source having data content on said display of said processor-based platform using said source software application;
   positioning said service application icon over a first displayed data source of said at least one data source having first digital data content;
   said service software application automatically pulling said first digital data content from said first data source in response to said positioning; and
   said service software application automatically populating at least one data target provided by at least one target software application with said first digital data content in response to said pulling.

2. The method of claim 1 wherein said step of launching said service software application occurs automatically in response to said step of launching said source software application.

3. The method of claim 1 wherein said step of said service software application automatically populating includes said service software application automatically launching said at least one target software application.

4. The method of claim 1 further including launching said at least one target software application before performing said step of positioning said service application icon.

5. The method of claim 1 wherein said service software application is pre-linked to said at least one data target provided by said target software application.

6. The method of claim 1 wherein said first digital data content includes at least one of text data, image data, graphics data, and a clipboard object.

7. A system for transferring information from a data source to at least one data target, said system comprising:
- means for launching a source software application on a processor-based platform;
- means for launching a service software application on said processor-based platform;
- means for displaying a service application icon on a display of said processor-based platform in response to said launching of said service software application;
- means for displaying at least one data source having data content on said display of said processor-based platform using said source software application;
- means for positioning said displayed service application icon over a first displayed data source of said at least one data source having first digital data content;
- means for automatically pulling said first digital data content from said first data source of said at least one data source in response to positioning said displayed service application icon over said first data source; and
- means for automatically populating said at least one data target provided by at least one target software application with said first digital data content in response to automatically pulling said first digital data content from said first data source.

8. The system of claim 7 wherein launching said service software application occurs automatically in response to launching said source software application.

9. The system of claim 7 wherein said automatically populating includes automatically launching said at least one target software application.

10. The system of claim 7 further including means for launching said at least one target software application before positioning said service application icon.

11. The system of claim 7 wherein said service software application is pre-linked to said at least one data target provided by said target software application.

12. The system of claim 7 wherein said first digital data content includes at least one of text data, image data, graphics data, and a clipboard object.

13. A non-transitory computer-readable medium encoded with computer-executable instructions constituting a service software application for transferring information from a data source to at least one data target, said computer-executable instructions including program code for:
- launching a source software application on a processor-based platform;
- launching a service software application on said processor-based platform;
- displaying a service application icon on a display of a computer-based platform in response to launching said service software application on said computer-based platform;
- displaying at least one data source having data content on said display of said processor-based platform using said source software application;
- positioning said service application icon over a first displayed data source of said at least one data source having first digital data content;
- automatically pulling the first digital data content from said first data source provided by said source software application in response to positioning said service application icon over said first data source; and
- automatically populating at least one data target provided by at least one target software application with said first digital data content in response to said pulling.

14. The computer-readable medium of claim 13 wherein launching said service software application occurs automatically in response to launching said source software application.

15. The computer-readable medium of claim 13 wherein said automatically populating includes automatically launching said at least one target software application.

16. The computer-readable medium of claim 13 further including launching said at least one target software application before positioning said service application icon.

17. The computer-readable medium of claim 13 wherein said service software application is pre-linked to said at least one data target provided by said target software application.

18. The computer-readable medium of claim 13 wherein said first digital data content includes at least one of text data, image data, graphics data, and a clipboard object.

* * * * *